United States Patent [19]

Obidniak

[11] Patent Number: 4,915,580
[45] Date of Patent: Apr. 10, 1990

[54] WIND TURBINE RUNNER IMPULSE TYPE

[75] Inventor: Louis Obidniak, Quebec, Canada

[73] Assignee: Sambrabec Inc., Montreal, Canada

[21] Appl. No.: 82,352

[22] Filed: Aug. 6, 1987

Related U.S. Application Data

[63] Continuation-in-part of Ser. No. 878,242, Jun. 25, 1986, abandoned, which is a continuation-in-part of Ser. No. 699,137, Feb. 7, 1985, abandoned.

[30] Foreign Application Priority Data

Feb. 7, 1984 [CA] Canada ............................ 446935

[51] Int. Cl.$^4$ .............................................. F03D 1/04
[52] U.S. Cl. ..................................... 415/2.1; 415/907; 415/908; 416/197 A; 416/185
[58] Field of Search ................ 416/185, 188, 197 A, 416/197 B, 243, DIG. 3, 227 A; 415/2–4 A, 2–4 R

[56] References Cited

U.S. PATENT DOCUMENTS

| | | | |
|---|---|---|---|
| 97,665 | 12/1869 | McCleave | 416/227 A |
| 102,939 | 5/1870 | Hubbard | 415/2 R |
| 184,345 | 11/1876 | Croft et al. | 416/188 |
| 207,189 | 8/1878 | Martin | 416/236 R |
| 220,083 | 9/1879 | Martin | 416/236 R |
| 552,164 | 12/1895 | Whitney | 416/182 |
| 596,553 | 1/1898 | Sörenson | 416/243 |
| 603,703 | 5/1898 | O'Connor | 416/227 A |
| 762,315 | 6/1904 | Joyce | 415/3 A |
| 983,984 | 2/1911 | Desenberg | 416/197 B |
| 1,002,833 | 9/1911 | Giddings | 415/2 A |
| 1,011,259 | 12/1911 | Smith et al. | 416/243 |
| 1,213,955 | 1/1917 | Roth | 416/235 |
| 1,279,320 | 9/1918 | Gamlen | 416/197 B |
| 1,433,995 | 10/1922 | Fowle | 415/2 A |
| 1,502,433 | 7/1924 | Johanson | 415/2 R |
| 1,827,225 | 10/1931 | Ferreby | 416/243 |
| 2,286,670 | 6/1942 | Condon | 416/175 R |
| 2,350,939 | 6/1944 | Sprouse | 416/243 |
| 2,977,091 | 3/1961 | Geppert | 416/188 |
| 2,996,120 | 8/1961 | McGregor | 416/227 A |
| 3,228,475 | 1/1966 | Worthmann | 415/2 A |
| 4,086,498 | 4/1978 | Szoeke | 415/2 A |
| 4,143,992 | 3/1979 | Crook | 415/3 A |
| 4,234,289 | 11/1980 | LeBost | 415/2 R |
| 4,295,783 | 10/1981 | LeBost | 415/2 R |
| 4,415,306 | 11/1983 | Cobden | 415/2 A |
| 4,457,666 | 7/1984 | Selman | 415/2 R |
| 4,522,600 | 6/1985 | Jöst | 416/11 X |
| 4,596,367 | 6/1986 | Wittner | 244/39 |

FOREIGN PATENT DOCUMENTS

| | | | |
|---|---|---|---|
| 145276 | 9/1950 | Australia | 416/188 |
| 195364 | 1/1958 | Australia | 416/197 B |
| 33383 | 6/1924 | Denmark | 445/2 A |
| 547884 | 12/1922 | France | 416/188 |
| 1111673 | 3/1956 | France | 415/3 R |
| 2305608 | 10/1976 | France | 415/2 R |
| 2491155 | 4/1982 | France | 416/11 |
| 2505938 | 11/1982 | France | 416/11 |
| 492190 | 3/1954 | Italy | 416/235 |
| 135568 | 11/1919 | United Kingdom | 416/11 |

Primary Examiner—Everette A. Powell, Jr.
Attorney, Agent, or Firm—McFadden, Fincham, Marcus & Allen

[57] ABSTRACT

A runner type wind turbine designed to utilize maximum of the available energy carried by low speed stream. This turbine has a turbine disc which deflects and discharges a wind stream in radial and parallel direction relative to the disc; a rotor construction permits the disc and its power shaft to be arranged and assembled in a vertical or a horizontal position. The turbine includes a disc, mounted on a shaft located in central guides affixed to an outer stationary turbine stand. The disc mounts a plurality air blade shaped in such a way that the incoming air impinges on the blades radially, circumferentially and outwardly relative to the turbine disc.

18 Claims, 16 Drawing Sheets

WIND TURBINE RUNNER IMPULSE TYPE

This application is a continuation-in-part of copending application Ser. No. 878,242 filed June 25, 1986 which is a continuation-in-part of Ser. No. 699,137 filed Feb. 7, 1985 both now abandoned.

This invention relates to a runner type wind turbine. More particularly, this invention is directed to an apparatus which utilizes the kinetic energy of freely flowing masses such as air. The natural energies contained in such fluids are infinite and inexhaustible and the present invention provides an assembly which permits the efficient recovery and control of the energies contained in such flow-fields.

Although the runner-type turbine is described in this disclosure as using the wind only, it is not a limiting factor and the same principles could be used to extract the energy from free-flowing water masses such as rivers and tidal or oceanic currents. Wind, however, will be used as flowing media to illustrate the invention.

Wind power has been known to humanity for a very long time and using its power, man moved upon the water for thousands of years. However, it is not only at the sea that the power of the wind has been put to work. On land, it has been used to run simple machinery for grinding wheat (hence named "windmills") or for pumping water.

All windmills are energy-conversion units and have one common item, namely a rotor or rotating part that converts the wind power into the power of a rotating shaft. The rotor is also called a propeller or "wind turbine" and will be referred to as such in this disclosure. The first windmills were built with a vertical shaft and flappers revolving around this shaft similar to the revolving door. This more familiar type of windmill has been used for a long time; in Europe mills were built on a central post so that they could be turned to face the wind. The horizontal shaft was turned by the vane. When the mills got too large, they were built with a revolving turret on top. This turret housed the shaft activated by a rotor and gear box. They featured big four-bladed rotors, rectangular in shape, facing the wind.

More recent developments of entirely different design have come into use. Water pumping windmills required a high starting torque and to help develop this torque, the rotor became multi-bladed, and was installed on tall towers and utilized a circle of sheet-metal vanes. It was also equipped with a rudder to keep the mill facing up-wind. However such multi-bladed rotors were not built to utilize high speed winds and had to operate at low-tip speed ratios. Once the rotor builds up some rotational speed, the blades fall into the "wake" or disturbance from preceding blades and the airflow becomes blocked by the rotor with the result that little power is produced.

Through the use of wind energy systems over the centuries, the propeller type wind turbine has been developed and put into operation. The rotor known as a "Jacobs" rotor is the one that is almost universally used today. It features two or three narrow blades that resemble aircraft propeller blades. These are high speed type of turbines operating at high tip speed ratio; however their starting wind speed is relatively high, approximately 8 mph.

The above mentioned rotors are horizontal-axis machines. A major draw-back of such machines is that the plane of rotor rotation must change to follow the wind direction changes. This is actually accomplished by using a "tail-vane" in the form of a vertical blade located to the rear of the rotor, which forces the rotor to rotate around a "Pivot" to face the wind. The high rotation speed of the rotor generates a gyroscopic effect, which resists any changes in-direction to face the changing wind direction.

All previously described systems have the axis of rotation parallel to the direction of the wind. Accordingly, in recent years a number of vertical axis rotors have been developed as an alternative source of converting kinetic energy contained in ambient wind stream, into shaft rotational energy. These machines have the axis of rotation perpendicular to both the surface of the earth and the wind stream. Vertical-axis rotors have an advantage over horizontal-axis units in that they do not have to be turned into the wind. These include the known Savonius, Darrieus, and Cycloturbines.

The "Savonius" rotor has blades that are "S" shaped in cross-section. While it is virtually self starting, it has a relatively poor efficiency rating.

The "Darrieus" rotors have curved blades with "troposkein" shape, that is the shape of blades in the shape of rotating flexible cable and which are formed in its cross-section as an air-foil. The rotors of this type have low starting torque at relatively high wind speed, similar to the propeller type, however, they boast high "tip" to "ting" speed rotation and thus have relatively high power output. They are omni-directional but not self-starting, and require a starter motor to bring the rotor up to speed when a sensor indicates the wind speed is adequate to produce power.

The "Cyclo" turbines (or gyro-mills) have several vertical blades accepting wind from all direction without orienting to it. It is also self-starting, however the efficiency is low and the tip-speed ratio is relatively low.

Many of the vertical axis machines are inefficient, since during rotation, the rotor blades must cut back into the wind stream, which tends to retard their rotation, leading to an inefficient power extraction.

All of the above mentioned types of wind turbines are limited in the type and concept of rotor design. They can be built with horizontal or vertical axis respectively, but the position of the power shaft and of rotor is influenced by the turbine design.

A further serious limitation of the state of art of the present wind turbine design is the fact that generally only one rotor can be mounted on one shaft. One exception is in the twin-impeller wind machine, in which one impeller is placed behind the other in a parallel, vertical plane.

The efficiency of such machines is not much higher than that of a single rotor, since both use the same wind-field cylinder, while rotating in opposite directions.

The only means to increase the power output of the present wind turbines is to increase their diameter, or blade height, which inherently increases the failure factor due to high mechanical stresses on the blades and the tower.

The foregoing type of apparatus highlights the fact that present wind powered turbines are machines placed in wind stream current to convert kinetic energy of wind stream into a rotation and power using direct force of that current as it moves past a rotor or impeller.

In theory, the performance of un-shrouded propeller-type wind turbines (or other existing units) is based on consideration made by "Betz" momentum theory, which relates to the deceleration in air traversing the wind turbine rotor and by Drzewiecki's blade-element theory which relates to the forces produced on a blade element. These theories are based on an observation that the column of air arriving at the wind turbine rotor with a velocity "V" is slowed down, and its boundary is an expanding cylinder. The reduction of wind velocity at the turbine rotor is usually expressed as an "interference" factor, "a". The axial momentum analysis further shows that behind the turbine rotor the interference factor is increased to a value of "2a".

The available maximum power in a wind current is obtained from slowing-down of the air and the recovery of the kinetic energy flowing through a given area per unit of time. Using all of this available power would represent a 100% efficiency factor of the wind turbine.

In existing wind turbines, the area of concern is the frontal area swept by the rotating blades. Depending upon the wind velocities, the number of blades and their configuration and shape, a great quantity of air current is lost, so that it does not participate in useful power conversion.

The power originally contained in an air cylinder can be expressed in general as $P = \frac{1}{2}\pi R^2 S V^3$. Reduced to atmospheric conditions prevailing at sea level and standard temperature, this formula can be simplified to $P=(2.14 \times 10^{-6}) \times V^3 \times A$, where "A" is an air inlet (rotor swept) area, and "V" is wind velocity. actual work obtained by existing wind turbines is reduced to $P=(2.14 \times 18^{-6}) \times A \times V^3 \times a(1-a)$. From both equations, it may be seen that the power obtained by the present ideal wind turbines is at maximum when $a=0.333$, in which case actual power which can be obtained by such a turbine is $P=59.9\%$ of the power originally contained in a given air column. Thus the "Betz" power coefficient, as it is generally called, has a theoretical maximum of 16/27 or 59.2% of original wind power disregarding, however, rotational and drag losses. This is of course the "power coefficient" of an ideal wind rotor with infinite number (zero-drag) of blades and non-shrouded propeller (or multi-bladed "American" type of rotor.

In practice there are some side effects which cause a further reduction in the maximum, attainable power coefficient, such as: the rotation of the wake behind the rotor, a finite number of blades and a draglift ratio larger than zero. There are certain mathematical and physical relations existing between power and rotational speed of wind rotor, and also between torque and rotational speed. Based on actual wind-tunnel tests and on the geometric arrangement of wind turbine, each type has a definite relation existing between power coefficient and tip-speed ratio.

For any given wind speed, the separate relation curves can be drawn, both for power and torque. However, these groups of curves are rather inconvenient to handle as they vary with each wind speed, rotor diameter and even density of the air. Therefore, the relation between power, torque and the rotational speed is generally considered "dimensionless" with the advantage that the behavior of rotors with different dimensions, geometry and different wind speeds can be reduced to two formulae.

One representing power coefficient "$C_p$" versus "$\lambda$" (tip speed ratio).

$$C_p = \frac{\text{Power Extracted by Rotor}}{\text{Theoretical Power Contained in Wind Cylinder}}$$

$$\text{and "}\lambda\text{"} = \frac{\text{Rotational Speed of Blade Tip}}{\text{Wind Velocity}}$$

and the second representing the torque coefficient:

$$C_D = \frac{\text{Actual Torque Obtained by Rotor}}{\text{Theoretical Torque}}$$

and the "$C_p$" and "$C_D$" are related by an expression stating that $C_D = C_p \lambda$, thus by knowing $C_p$, torque coefficient $C_D$ can be calculated and $C_D$ versus $\lambda$ curves can be drawn.

As disclosed hereinafter, different curves for horizontal and vertical rotors, two-bladed and multi-bladed arrangements are shown. One can clearly deduct from these diagrams that the multi-bladed "American" rotor operates at low tip-speed ratio, and two or three-bladed rotors operate at high-tip speed ratios.

Thus, the maximum power coefficient (at the so-called design tip-speed ratio) does not differ all that much but there is a considerable difference in torque, both in starting torque (tip-speed ratio =0) and in maximum torque.

Another significant factor is that the multi-bladed "American" rotor, "Savonius" type, and four-bladed "Dutch" rotor all reach their top power coefficient at low wind speeds, and that the power extracted from the wind at higher wind velocities falls down to zero relatively quickly.

The two or three-bladed rotors have a "power" factor slightly higher but the starting wind speed is much higher (usually at 8 mph), therefore the rotational speed is high for the same power factor, however starting torque is low and this poses certain limitations on the use of presently built bladed rotors.

It can be appreciated from the above discussions that the wind velocities and therefore their related kinetic energies are the leading factors to be considered while constructing any wind turbine.

It is well known that in different continents, one can observe that there are well defined groups of wind velocities, which predominate and are called "prevalent" (frequent) winds. There is also a well defined group of winds which contain the bulk of the energy called "energy" winds. Usually the prevalent winds blow five out of seven days, the energy winds blow two out of seven days (or 28%). The velocities of energy winds are approximately 10 to 15 mph, the most frequent prevalent wind is estimated at 3 to 8 mph.

Therefore a desirable wind power extracting device should be able to operate and have a-well regulated power output using all the above winds, since the prevailing winds produce about ¾ of the total wind energy over a given time period. Even during a calm summer month, 70% of the energy comes from the winds which blow only 28% of the time.

Considering the foregoing observations and taking into account the operational data, as described hereinafter, of present wind turbines, one can conclude that at the same wind speed and same rotor diameter, a multi-bladed "American" turbine would reach its peak operating performance at tip-speed ratio=1 and the power ratio=0.3, resulting actually in a low number of rotor revolutions. A further increase in tip-speed ratio means an increase in wind velocity and the number of revolutions of the rotor resulting in a turbine performance falling down to zero.

A propeller type rotor has a starting wind speed well above the point where the "American" multi-bladed rotor is not delivering any power. The power coefficient versus tip-speed ratio curve of bladed type of rotors is more flat, therefore it can accept higher wind speeds with almost the same power coefficient.

It can be appreciated from the foregoing discussion that little has been accomplished in the present state of art of wind turbines in the way of molding, shaping, redirecting and rearranging the incoming wind stream upon the rotor in such, a way as to avoid the shortcomings of multi-bladed or propeller type rotors. Thus it would be desirable to obtain a wind turbine rotor which would incorporate the advantages of both types, while actually supplying a link between these two types of existing rotors.

To exemplify the above, reference may be had to the prior art relating to turbine blades; U.S. Pat. No. 4,596,367 discloses a device which, as a modular unit, includes a pair of triangular vanes arranged in a staggered, overlapping relationship and joined together along an interconnecting panel. The triangular pockets form a "scoop" so that the device, when rotating about a central axis, presents a first and then another of the triangular pockets to a wind flow.

U.S. Pat. No. 4,522,600 discloses a blade arrangement composed of three curved sheets, one end of which is journalled on a shaft. Other than being a planar curved outline, no structure is imparted to the sheets so that the latter merely appear to act as a wind "stop".

U.S. Pat. No. 603,703 discloses triangularly shaped propellers, similar in structure and configuration to a "scoop". In the arrangement shown, a plurality of these triangular propellers are journalled on a shaft. A wind stream is adapted to enter the narrower front portion and be discharged from the wider outlet, the air being discharged being directed into the next propeller.

U.S. Pat. No. 1,213,955 has (in FIG. 2) a configuration which is best illustrated in the blank form. When folded to form a fan blade, a "scoop" having a very large side for the fan is formed, with the opposed side being either of a minor triangular configuration or of a "tab" outline. Different configurations for pairs of blades, mounted in tandem, are possible depending on which side of the blank is folded over the principal axis.

Australian No. 145,276 discloses cylindrical hollow bodies, much in the form of a tube, and relies on a central cap to deflect wind into the hollow bodies.

French No. 547,884 discloses a windmill with blades which have an arc-shape. As noted therein, the contour of the blade structure is such that it has a further arc extending in a principal flow direction.

Italian No. 492,199 discloses a plate-type arrangement, in which "hook-shaped" projections extend above the plane of the plate in order to catch wind flows.

U.S. Pat. No. 2,996,120 discloses in FIG. 4 parallelogram-shaped blades, partially of a closed structure, in cross-section in which the air flow enters a mouth into the closed parallelogram-shaped cross-section forming a discharge outlet.

A wind wheel is disclosed in U.S. Pat. No. 552,164 in which the blades have a major surface with an upstanding and curved smaller triangular flap extending into a portion of the blade.

U.S. Pat. No. 220,083 discloses a windmill, in which the blades are curved lengthwise and provided with an inclined flange on the outer edge. This inclined flange appears to provide a greater inlet area to capture a wind flow; this type of structure does not permit a vertical arrangement and as well, does not provide any radial wind deflection and depends on a different type of airflow around the blades to generate power. In a further patent of Martin, U.S. Pat. No. 207,189, again no vertical arrangement is possible and no radial wind deflection can be obtained.

In accordance with one aspect of this invention, there is provided an improved turbine blade which is suitable for use in a wind turbine for harnessing power from wind. More particularly, in accordance with one form of the present invention, the turbine blade is adapted to receive a flow of air from a wind stream at an inlet portion of the blade and deflecting the air via the blade to an outlet portion thereof, the blade comprising a body having a pair of opposed major planar surfaces and a generally conoid-shaped configuration with a pair of opposed open ends, one end forming a discharge outlet with a cross sectional area of the conoid-shaped body proximate the discharge outlet being less than the cross-sectional area intermediate the discharge outlet and the inlet portion.

In accordance with a further aspect of this invention, there is provided a still further embodiment and deflecting means for deflecting a fluid flow from the outlet in a direction angularly disposed relative to the normal fluid flow established by the conoid-shaped body.

In accordance with a further aspect of the present invention, there is provided a method of recovering usable energy from a moving fluid stream having in one form a principal fluid flow in a primary first direction comprising disposing a conoid-shaped body in the fluid flow, the conoid-shaped body having a hollow interior in which the hollow interior faces the fluid flow direction, intercepting a first component of fluid flow of the fluid stream in an inlet portion of the conoid body to deflect the first component and angularly to the principal fluid flow direction of the fluid stream, angularly intercepting a second component of the fluid flow within the conoid-shaped body and deflecting the intercepted second component in tangentially of the fluid flow direction, combining the axial fluid flows of the first and second components, causing the combined axial flow to pass through an area of reduced cross-section.

In a still further embodiment, the above method is modified wherein there is included the step, after the combined axial flow is caused to pass through an area of reduced cross-section of deflecting: the combined axial flow in a direction tangentially disposed relative to the principal direction of the combined axial flow.

In a still further embodiment in the present invention, there is also provided a blank suitable for use in a turbine blade, which blank comprises a sheet of non-flexible material, the sheet having a generally planar configuration with a pair of opposed major surfaces, the blade and a first side forming an arcuately contoured inlet edge for the body, a lateral side angularly disposed relative to the contoured first side and extending backwardly and outwardly therefrom, a second lower side angularly disposed relative to the first pair of sides and extending inwardly and rearwardly of the body, and being angularly disposed to the deflector when the deflector is included, and to an axial line of the blade, and a rearwardly projecting recess between the sides, the blade being bent along an axial line extending between the first arcuate side and said last mentioned side to generally a conoid configuration. The second lower angularly disposed side of the blade forms the incoming radially deflected air and causes it to flow around to the backside of the blade in a fashion similar to an air-foil contour, thus creating a pressure differential between the inside and the outside of the blade.

In further detail of the present invention, the blank used to form the turbine blade, and the blade formed therefrom, may be made of any suitable material capable of withstanding the forces encountered for its intended operation. Typically, these will be metals of various types, or alternately, cast or molded plastic material. In the case of sheet materials, normally these will be die-cast or stamped into blanks of the appropriate shape, and subsequently contoured to form a conoid-shaped body according to the structure of the present invention. With respect to metallic materials, these may also be die-cast if desired. Typical metallic materials include aluminum, steel, cooper or the like: in the case of plastic materials, the blade may be formed from various types of polyolefins or copolymers.

The turbine blades of the present invention, is explained hereinafter in greater detail, may be used in structures varying from small portable units to relatively large stand-alone structures. Typically, a plurality of blades e.g. ten(10) to thirty(30) or more, are arranged on a suitable supporting structure, oriented so that the hollow body portion of the conoid configuration is adapted to face the principal direction of the oncoming fluid stream, and the blade assembly is then permitted to rotate about a fixed axis in the direction of rotation caused by the oncoming fluid stream. To this end, the individual blades are preferably provided with mounting means (such as lips or the like) to permit the individual blades to be fastened to an assembly ; alternately, it is also possible to a supporting member to form an assembly-this assembly may be die-cast with the blades and other components as described herein as a one-piece structure, which is particularly appropriate for smaller sized units.

When the blades are provided with mounting means, a supporting sub-structure will be provided for arranging the blades to be mounted in a front-to-rear alignment; for most efficient operation, the blades are mounted in such an alignment in a relatively close relationship.

The overall arrangement of the blades on a supporting structure can vary considerably, however two or more rows of blades, as well as two or more subassemblies, each carrying one or more rows of turbine blades, can be mounted on a single assembly. In this manner, a plurality of such sub-assemblies may be used with a common supporting apparatus to increase power generation. Likewise, two(2) or more assemblies may be coupled together, each assembly having two(2) or more sub-assemblies with the turbine blades thereon.

One aspect of the blade design is that it can be assembled in a radial direction as described herein or can alternately be mounted axially directly in the path of an air or fluid flow without any deviation. The blade axial has an individual wind stream deflecting system to decompose the axial flow into three different vectors, and can be thus mounted on circular rings, including mounting of the blades in the central area of a circular ring. Each circular ring may have a variable diameter, which may be variable as well as being axially inclined to handle increased circumferential speed.

The turbine blades of the present invention are particularly adapted for use in wind turbines, but may also be used for liquids such as water-ie. in water turbine structures. Since most turbine blades find application in wind the turbine technology, reference to the blades and structures to the present invention as wind turbine technology will be made in describing further features.

In preferred embodiments of the invention, the conoid-shaped body is desirably provided with a first pair of spaced-apart lateral sides adjacent or at the inlet portion of the blade, which sides have three(3) lateral edges which are angularly disposed relative to the inlet and extend outwardly and upwardly/rearwardly of the inlet. Preferably, these lateral sides extend, in the blade configuration, downwardly from the conoid-shaped body and are identical so as to form parallel, or substantially parallel opposed side portions of the body. In addition to the inlet section of the conoid body, this first pair of sides also defines an air inlet portion for the turbine blade, which functions to capture a component of a air stream and direct the same toward the interior of the conoid body. Generally speaking, these side panels terminating the first pair of spaced apart side edges will be obliquely disposed relative to the air inlet, thus providing a greater cross-sectional area from the mouth or inlet of the conoid body, which preferably increases from the inlet to a point intermediate the inlet and discharge openings of the conoid-shaped body.

The conoid-shaped body is also provided with a second pair of sides intermediate the discharge opening and the first pair of sides and in an assembled form, the second pair of sides preferably is disposed at an acute angle relative to the inlet. The second pair of disposed sides of the conoid body also intersects the first pair of disposed sides, again in an angular relationship thereto, and defines an area of greatest cross-section for the conoid body at the point of intersection. However, not all forms of the invention need be limited to the area of greatest cross-section being located at the point of intersection of the first and second pairs of sides, as beneficial results will still be obtained where the area of greatest cross-section of shape of the conoid body is not at the point of intersection.

According to the present invention, improved results in terms of power recovery are attached by providing the turbine blade with deflecting means for deflecting an axial flow of air along the conoid body, at the discharge end of the device. To this end, the deflecting means is effective to deflect the axial flow of air being discharged in an amount preferably of up to about 35° relative to the axis of the axial flow through the conoid-shaped body, and most preferably between 10° to 30°. Although this may vary, by creating a deflected exhaust flow of air from a turbine blade, it has been unexpectedly found that this will contribute to an increase in efficiency of the turbine blade which in turn results in e.g. higher power outputs. It is thought that this is due to the fact that the deflected exhaust air can be removed from the environment surrounding the rotating turbine blades in a more efficient manner, so as to avoid interference with the flow patterns of the surrounding atmosphere.

In preferred embodiments, the deflecting means preferably deflects the air in an air flow having the general configuration corresponding to that prior to deflection, and thus avoid loss of power due to changing cross-sections at the discharge point for the exhaust air. However, it is not essential that the profile of the deflected air flow be specifically axial prior to being deflected; in larger installations, using large-sized blades, different profiles may be employed for different purposes where it is desired to re-direct spent or exhaust air from a structure through, e.g. secondary exhaust arrangements.

The deflecting means may be an extension or a part of the exhaust or discharge outlet of the turbine blade; to this end, the conoid-shaped body may continue with an extension thereof, appropriately angled, extending into the air stream flow. It is important to note, in accordance to the present invention, that when the deflecting means acts upon an axially-flowing air stream, that the complete or total cross-section of the air stream need not be deflected. In practice, it has been found suitable to use deflecting means which extend into the path of the axially flowing stream at the discharge outlet to only a depth ranging from 5% to 50% of the depth of the outlet, and angled between 1° to 35°, in order to achieve the improvements of the present invention. In this respect, the deflecting means preferably forms an extension of, and is integral with, the interior surface of the conoid-shaped body.

In the above described embodiments, the, blade most desirably has a three-dimensional air inlet with a first body portion lying in a first plane and being formed at least in part by a first leading edge and a second body portion formed at least in part by a second edge and lying in a plane space from the first body portion, both the first and second body portions being joined by an intermediate body portion of a generally arcuate configuration. In this form, the blade also desirably has a three-dimensional air discharge outlet with a first discharge body portion lying in a first plane, and a further body portion forming a part of the discharge air of the blade lying in a second plane spaced from the first plane, and an intermediate discharge body portion in the second plane and forming a generally arcuate tapered configuration.

A wind turbine assembly of this invention comprises a plurality of the blades mounted on an air deflector, the deflector being operatively associated with a power take-off means, with the means for deflecting the air being operative to direct an air flow into the inlet area of the blades.

In the above assembly the means for deflecting the incoming air to the blades may take the form of an air deflector adapted to deflect the incoming air radially through a plurality of blades mounted circumferentially of the deflector. The assembly may include an air shield at least partially covering the blades.

Having thus generally described the invention, references will now be made to the accompanying drawings, illustrating preferred embodiments and in which:

FIG. 18A is a section taken along the line XVIIIA of FIG. 18;

FIG. 18B is a section taken along the line XVIIIB of FIG. 18;

FIG. 18C is a section taken along the line XVIIIC of FIG. 18;

Figure 1:
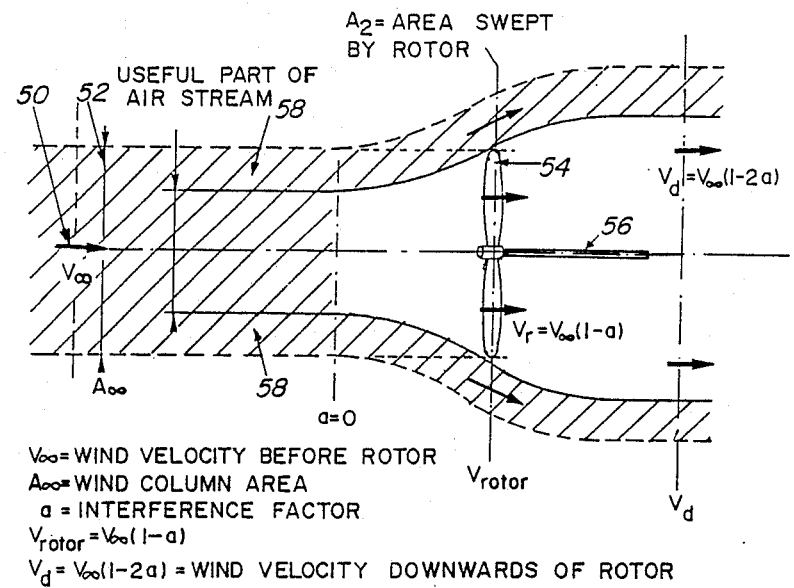
FIG. 1 is a schematic view showing a fluid flow field around known two or multi-bladed rotors.

Referring now to the drawings in greater detail, and initially with respect to FIGS. 3A through 3D, there is illustrated a turbine blade according to the present invention; the blade preferably comprises a one-piece body indicated generally by reference numeral 20, having a leading edge 22 which forms an air-inlet for the blade. Leading edge 22, as will be seen from FIG. 3, has a generally arcuately shaped outline and in the form shown, forms with a second edge defined hereinafter, a three-dimensional air-inlet with a first body portion 24 overlying a second body portion, preferably in a substantially co-planar relationship, with an intermediate portion joining the two portions 24 and 26. The intermediate portion is preferably of an arcuate configuration although other configurations may be employed to provide a three-dimensional air-inlet.

A second angularly displaced assembly edge 28 is angularly disposed relative to the leading edge and also forms in the particular configuration illustrated, a portion of the air-inlet for the blade. The assembly edge 28 is adapted to mount one..portion of the turbine blade to a turbine, again as described hereinafter in greater detail.

The body of the blade 20 terminates in a three-dimensional outlet again in the configuration shown, and is provided with a third trailing edge 30 preferably angularly displaced relative to the leading edge 22 at well as the assembly edge 28. A fourth air discharge edge 32 is generally angularly disposed relative to the edge 28; the rear portion of edge 30 together with edge 28 forms a semi-conically shaped air-outlet for the body in the form of a three-dimensional outlet as will be seen from FIG. 3D.

The outlet, like the inlet, preferably is in the form of a three-dimensional air discharge outlet with the edge 30 forming a first upper-body portion 34 lying in a generally co-planar relationship with a lower-body portion formed by the air discharge edge 32 and indicated by reference numeral 36. An intermediate body portion of a generally semi-circular configuration indicated by reference numeral 38 joins the upper and lower portions 30 and 36.

Figure 3A:
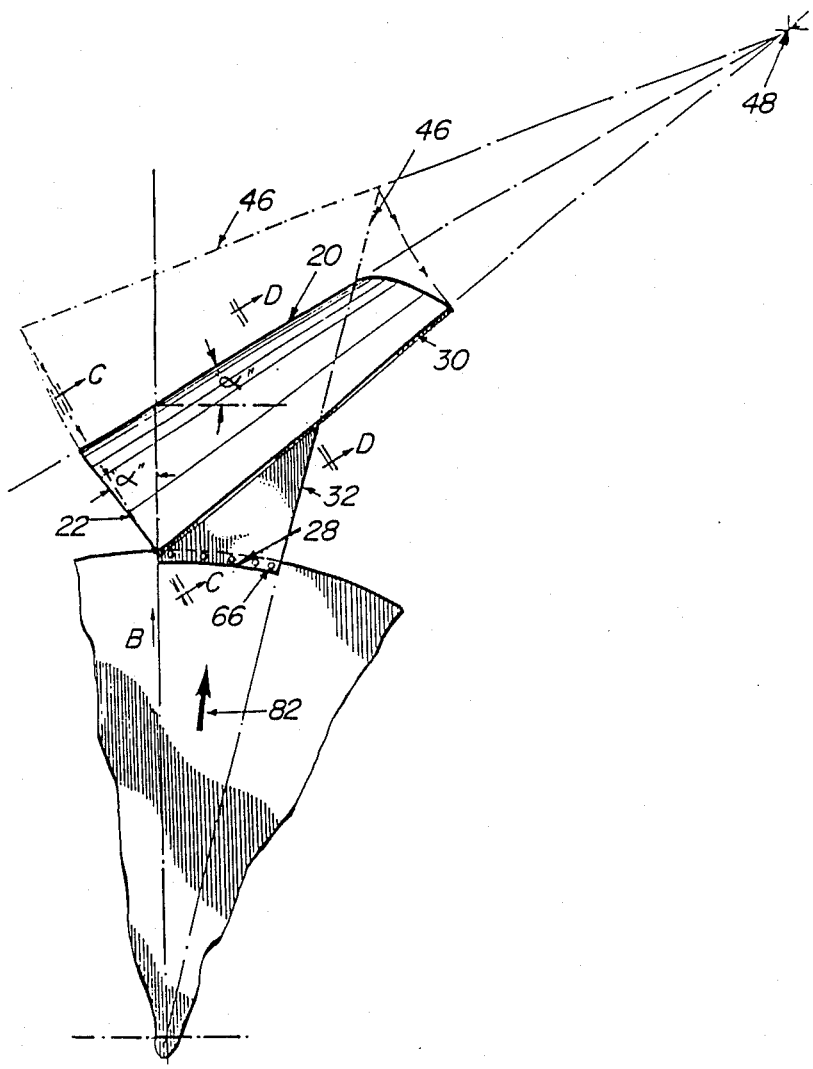
FIG. 3A is a perspective view of a turbine, blade of the present invention.
Figure 3B:
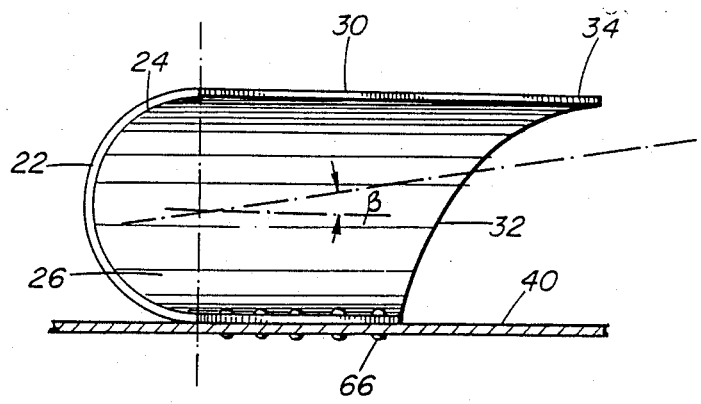
FIG. 3B is a side elevational view taken along the arrow 82 of FIG. 3A.

As will be seen from FIGS. 3A-3D, each blade generally forms a conical configuration with the base of the cone forming the angle "alpha" as shown in FIG. 3A with the center line of the blade and an angle "beta" with the mounting surface of a support 40 described hereinafter in greater detail.

From the above description, the blades will be seen to basically have a conoid shaped body in which the body includes a pair of opposed sides 24 and 26 with an arcuate portion 22 joining such sides. In the version of the blade illustrated in these particular figures, the side 26 includes an extension of the conoid shaped body which is adapted to permit it to be mounted as described hereinafter; also, the conoid shaped bodies in this case do not have equal lengths in that the portion 30 of the blade is not coextensive with the opposite side wall. In cross-section, as will be seen from FIGS. 3C and following, the blade has a greater cross-sectional area at the leading end as opposed to the discharge end.

Figure 3C:
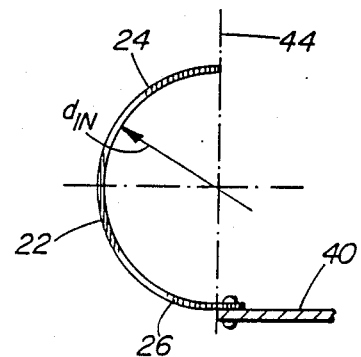
FIG. 3C is a section taken along the line C—C of FIG. 3A.
Figure 3D:
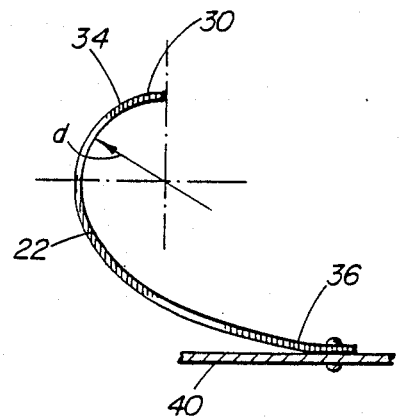
FIG. 3D is a section taken along the line D—D of FIG. 3A.

The blades are provided with an air-inlet diameter based on the three-dimensional configuration, which diameter (FIG. 3C) is measured along the vertical line 44 indicated in FIG. 3C.

As will also be evident from FIG. 3A, an outline 15 indicated by the dotted lines 46 is illustrated, showing the blade in the form of a flattened layer of material. The dotted lines illustrate the configuration of the blade prior to forming into the three-dimensional configuration otherwise illustrated in FIGS. 3A-3D.

Likewise, from FIG. 3A, the projected dotted lines terminating at the point 48 illustrate the cone-shaped configuration of the blades.

Referring now to FIG. 1, illustrating a typical prior art arrangement, involving two or multi-bladed rotors, it will be seen that a fluid, such as a flow of air or wind, which is used hereinafter to illustrate the apparatus of the present invention, approaches the inlet of a typical device and is induced to a circular" motion and subjected to radial acceleration in a plane parallel to the rotor's plane. Thus; the flow of wind, indicated by the arrow 50, initially enters the turbine structure with the wind-stream having a diameter indicated generally by the line 52.

Within the turbine assembly, the propeller blades 54 are mounted on a suitable power take-off shaft 56; as will be seen from FIG. 1, studies have shown that there is an unused air-stream indicated by the shaded lines 58. In this respect, the rotational speed of the blades 54 results in a rotational character of a windstream approaching the rotor; thus an air cylinder at the rotor plane expands due to the centrifugal forces imparted to it and approximately forty percent of the kinetic energy is lost by this phenomenon, known as the Betz coefficient. The rotation of the wake behind the rotor also results in additional kinetic energy losses and a lowering of the power coefficient. Also, given a finite number of blades, in place of an infinite number of blades,-will cause an extra reduction in power, particularly at low tip-speed ratios. This is due to the pressure leakage around the tip of the blade, forming cross-flow around the blade tips.

As will also be seen from FIG. 1, the various velocity factors are shown at the different locations for a conventional arrangement. In FIG. 1, and in the above description, the term "expanding cylinder" refers to the form of the column of air arriving at the rotor with a velocity "$V_2$" is slowed down—thus forms the "expanding cylinder".

Figure 2:
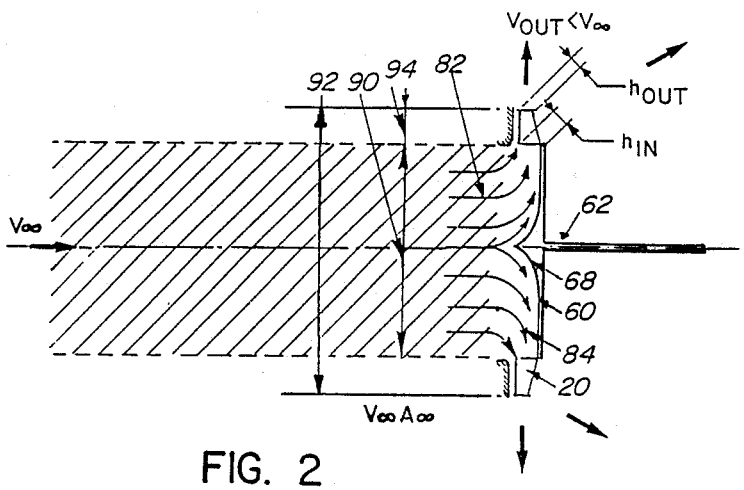
FIG. 2 is a schematic cross-sectional view of a runner-type rotor encompassing the present invention.

Referring now to FIG. 2, and the blades as previously described, an apparatus according to the present invention comprises a plurality of the blades 20 mounted circumferentially and peripherally about air deflecting means which is in the form of a disc 60 which in turn, is connected to a power take-off shaft 62 and which may be connected to various devices according to conventional technology. The disc 60 preferably comprises a one-piece flat member and may be made of any suitable material for the purpose; disc 60 mounts the blades 20 along the longitudinal edge 28 by suitable means—e.g. rivets, screws, or the like as indicated generally by reference numeral 66 (See FIG. 3A).

Figure 4:
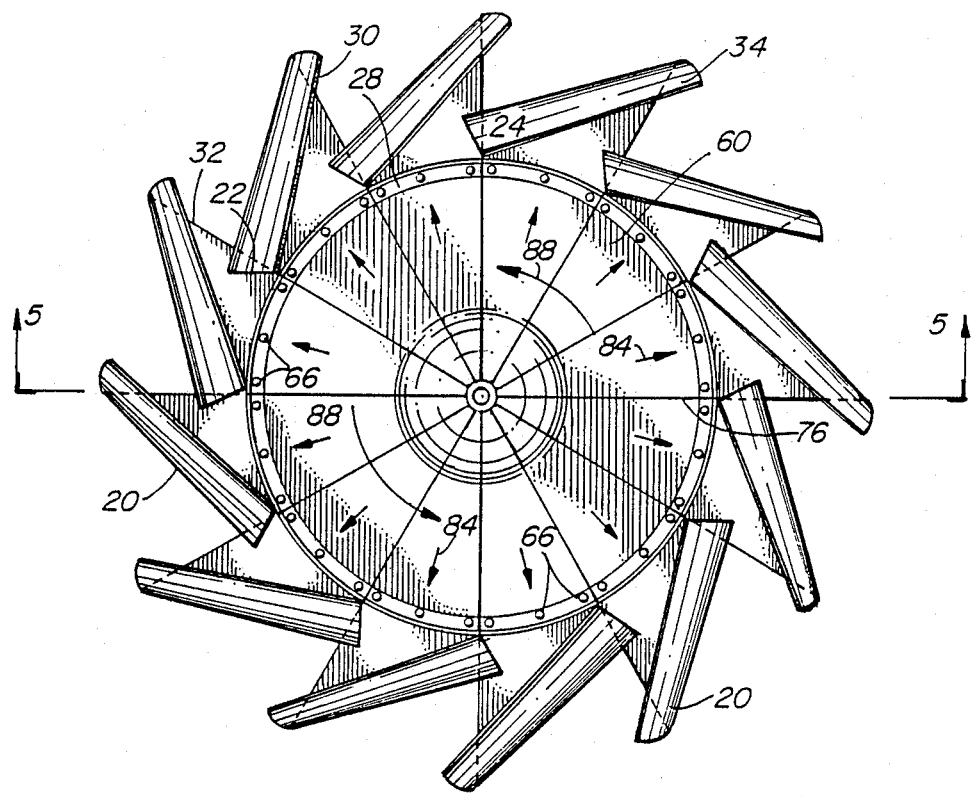
FIG. 4 is a top plan view of a runner-type rotor having the blades of the present invention.
Figure 5:
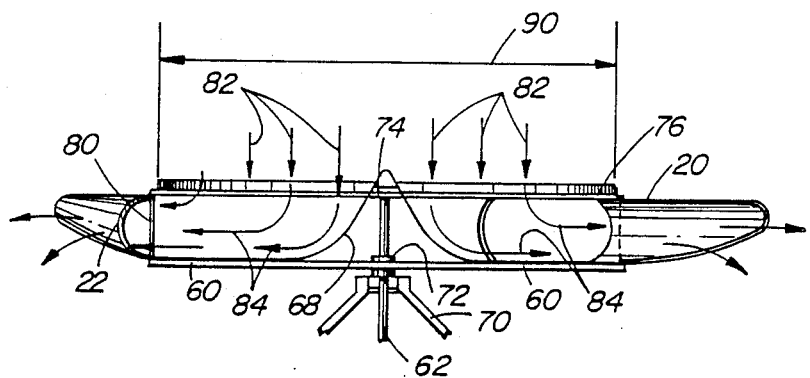
FIG. 5 is a section taken along the line 5—5 of FIG. 4.

As will be seen from FIGS. 4 and 5 in particular, disc 60 may include a central cone deflector 68 which may be mounted to the disc by suitable means (not shown). The cone deflector 68 may extend axially outwardly beyond the blades 20 (FIG. 5) if desired.

The power shaft 62, shown in greater detail in FIG. 5 may, depending on its particular application, be mounted by a member 70 which can take various shapes and sizes. The shaft 62 may be fixedly journalled to the disc 60 by means of bushings 72 and in the arrangement shown in FIG. 5, the shaft 62 may extend beyond the disc 60 and mount the cone 68 by means of a further bushing 74.

A plurality of tie rods 76 may be employed for the purpose of centering the disc and blades; as will be seen from FIG. 4, a plurality of such tie rods may be radially mounted by suitable means (not shown) to the cone 68 or alternatively, to the shaft 62 or bushing 74.

Depending on the material from which the blades are made, it may be desirable to fixedly. Secure more than one edge of the blade; thus, as noted above, the longitudinal edge 28 may be secured to the disc and in addition, the outer edge of the otherwise relatively thin blades can be further secured by employing spacers 80 secured to the disc at one end and at the other end, at either the point of intersection between the edges 22 and 30 of the blade (FIG. 5). Spacers 80 may be secured by appropriate means—e.g., screws, bolts, etc. In such an arrangement, the centering tie rod may, at the outer peripheral end, likewise be secured to the spacers for additional stability (FIG. 5).

The assembly of the blades about the circumference of the disc 66 is generally made so that the leading edges of a given blade overlap with an adjacent blade; by mounting the blades in this manner, a mass of fluid-flow is thus forced, after being deflected by the deflecting means to participate in energy conversion, and consequently impinge upon the rotor blades. By mounting the blades in the preferred manner as illustrated, the deflected air coming inwardly, as indicated by the arrows 82, impinges on the blades radially, circumferentially and outwardly relative to the disc plane (as shown in FIGS. 4 and 5). Thus, the air-flow indicated by arrows 82 with the cone deflector 74 assumes the configuration indicated by arrows 84 and is passed to the three-dimensional inlet of the blades. This assumes a direction of rotation indicated, by the arrow 88 (FIG. 4).

As will also be seen from FIG. 5, utilizing the applicant's construction, a full width or diameter of air-flow is permitted to be passed to the apparatus of the present invention; this will be obvious from the diameter line 90 illustrating that the full width of the air-flow is permitted to enter against the disc 60. Thus, again as will be seen from FIG. 2, the blades indicated generally by reference numeral 20 extend beyond the disc to have an outlet diameter, when mounted, and as indicated by line 92, with the difference between the total inlet area 90 on the diameter versus the diameter 92 will generally equal the blade length indicated by the line 94 according to a preferred construction.

Figure 6A:
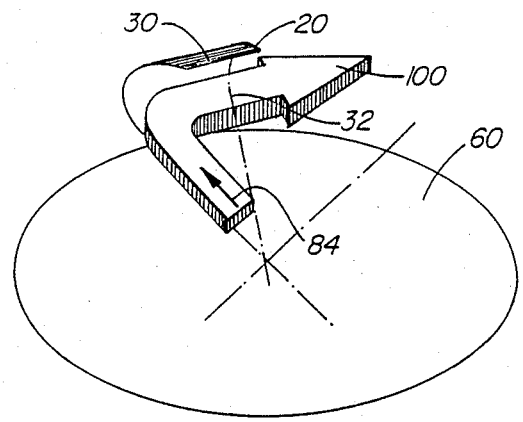
FIGS. 6A, 7A and 8A are perspective views of the blades of the present invention showing the different fluid actions on the blade.
Figure 6B:
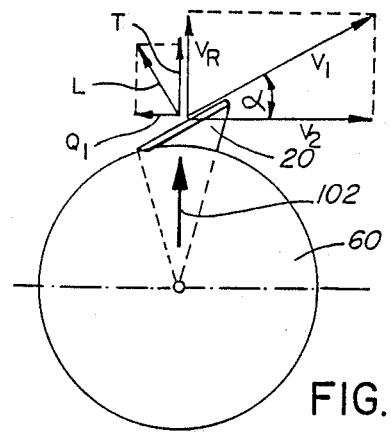
FIGS. 6B, 7B and 8B are vectorial views of the frontal impulse, impulse and reactive types of action of a fluid on the blade.
Figure 7A:
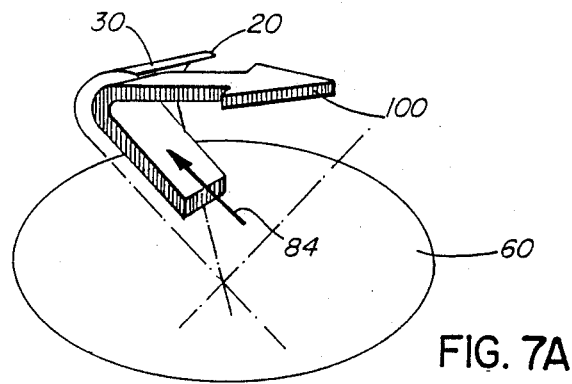
Figure 7B:
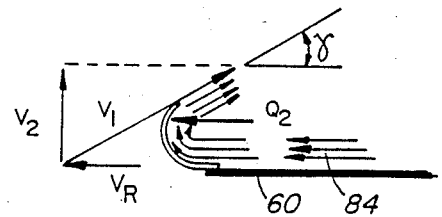

The mounting of the blades, and their configuration according to the present invention, provides for the use of the incoming air to radially, circumferentially and outwardly impinge on the blades to obtain a high degree of efficiency. This will be evident from FIGS. 6A through 8A, which illustrate the advantages of the special shape of the conical contour which radially extends away from and on an angle to the disc relative to its outer periphery and plane. From these Figures, deflected wind segments impinge on each individual blade and produce a reaction and impulse force by changes in the flow-velocities of the wind and directions as indicated in the drawings; it will be seen that the force vectors of the impinging air-stream are individually imparted to the blades and that they are complimentary to each other. Thus, FIG. 6A illustrates the radial wind segment direction relative to the blade 20 with the arrow 100 indicating the radial segment. In this manner, as will be seen from FIG. 6B, with the arrow 102 indicating the radial wind velocity from the center of the turbine arrangement, the diagram illustrates that there is a radial wind velocity $V_R$ with $V_1$ indicating the wind velocity relative to the blade 20. $V_2$ indicates the circumferential wind component; L is the lift force and T is the thrust force with $Q_1$ being the useful torque force.

In FIG. 7A, again due to the configuration of the blade, the radial wind segment indicated by the arrow 100 also generates a further configuration (See FIG. 7B) where a portion of the wind is deflected along the edge 30 and in this case, the radial velocity ($V_R$) component also has a $V_1$ wind velocity relative to the blade and $V_2$ velocity which is perpendicular to the disc 60. $Q_2$ thus defines the useful torque force.

Figure 8A:
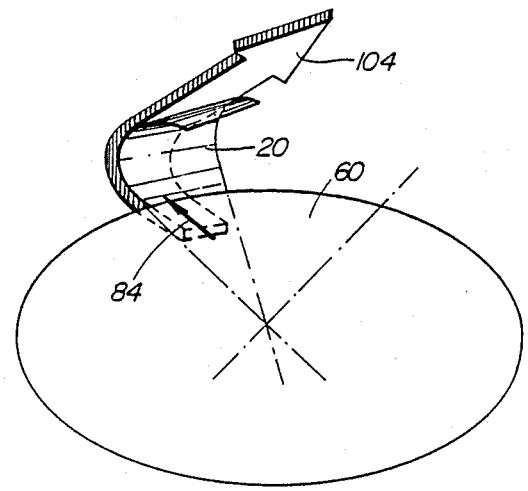
Figure 8B:
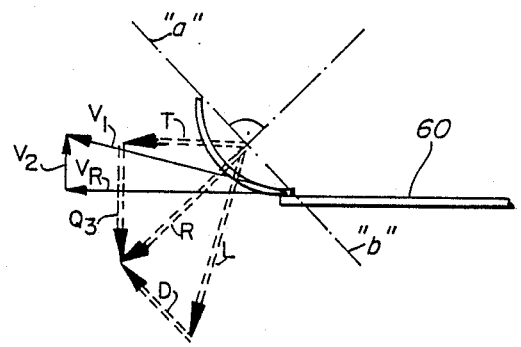

The third force acting on the blade 20 is illustrated in FIGS. 8A and 8B with the wind segment being indicated by the arrow 104. As illustrated in FIG. 8B, the force for the radial wind velocity $V_R$ includes $V_1$ which is the wind velocity relative to the blade 20, $V_2$ which is the circumferential wind component; R which is the force perpendicular to a line a—b; L is the lift perpendicular to $V_1$ and D is the drag (parallel to $V_1$) The thrust T is shown by the arrow therein and the resulting torque force indicated by $Q_3$.

Consequently, from the above, the total force acting on each blade is equal to the sum of $Q_1$ plus $Q_2$ plus $Q_3$.

It will thus be seen, from the above description, that with the blades and the turbine assembly of the present invention, the phenomena described above are purposely exploited by specifically diverting an airstream from its horizontal flow to form an expanding, radial flow-field. Thus, a runner-type turbine is utilized with the flow-fields as indicated in FIG. 2, created by a disc which deflects an incoming air-flow, preferably in a direction perpendicularly to the direction of the airflow. An air-flow, entering the turbine structure, thus strikes the disc and is deflected perpendicularly and discharged radially and parallel to the disc and in this form, is basically a non-de-energized wind strength which impinges simultaneously during the rotation of the blades 20. The blades, due to their configuration and structure, substantially avoid any dissipation of kinetic energy which would otherwise result in power losses for the inlet area and substantially the complete mass of the wind stream is thus forced to participate in energy conversion. In this manner, the wind stream thus impinges as described above, namely in a radial, circumferentially and outwardly extending direction relative to the disc 60.

It will also be seen that the rotational speed of the blades result in a rotational character of the wind stream as it approaches the rotor; thus an air cylinder or cone, preferably expands, and aids in the displacing of the incoming wind stream.

In the preferred form, it will also be seen from the above description that the diverted wind stream runs generally parallel to the disc 60 and is broken down at the blade area into three circumferential vectorial components over each blade (FIGS. 6-8); the circumferential components of wind velocities impart to the rotor its rotating motion and thus furnish the useful torque to the disc and shaft.

It will also be understood from the foregoing that due to the structure disclosed herein, the apparatus disclosed herein can have the blade tip's circumferential speed at any speed different to the primary wind speed and that the ratio to each other will thus not have the same efficiency meaning as is the situation with existing fluid turbines.

The relative wind velocities and the vectorial decomposed elements produce a reaction and impulse force on each blade by the changes in the flow direction and velocities around the air-foil, with the result that the dynamic pressure on the air-foil blade facing the wind streams segment is higher on the reverse or down-wind side. The relative wind speed and forces acting on the blade are thus formed by three components as is evident from FIGS. 6-8, namely (1) a radial or frontal deflection impulse; (2) an impulse force due to the blade curvature—FIG. 7 and (3) a lift force due to the air dynamic air-flow around the air-foil configuration. Thus, the construction and shape of the blades of the present invention, the deflecting angles, the number of blades on the diameter of the blades are differing parameters utilized in the present invention in the conversion of energy using the turbine of the present invention. An in-flowing fluid energy stream, after completing its function relative to the blades, must exit from the turbine effectively and without substantial resistance and with substantially the same volumetric flow which is equal to the inlet stream. For this reason, the three-dimensional blades and their rotation provide the required requisites for this purpose; as otherwise disclosed herein, the three-dimensionally shaped blades an the rotation provide an enlarged exit; the enlarged exit preferably has the configuration as described in FIG. 2 where $V_{out}$ is smaller than $V\infty$; as will also be seen from FIG. 2, the blade inlet area shown therein as $H_{in}$ is smaller than the discharge area $H_{out}$. The amount of the difference between the blade inlet area and the blade outlet area, or inlet versus outlet, will vary depending upon the type of fluid flow, the size of the blades, the blade diameter, etc. and may range from 10% or more in volume to 50% or more. These factors will be chosen, as indicated, depending on the particular application, the number of blades etc.

Figure 9:
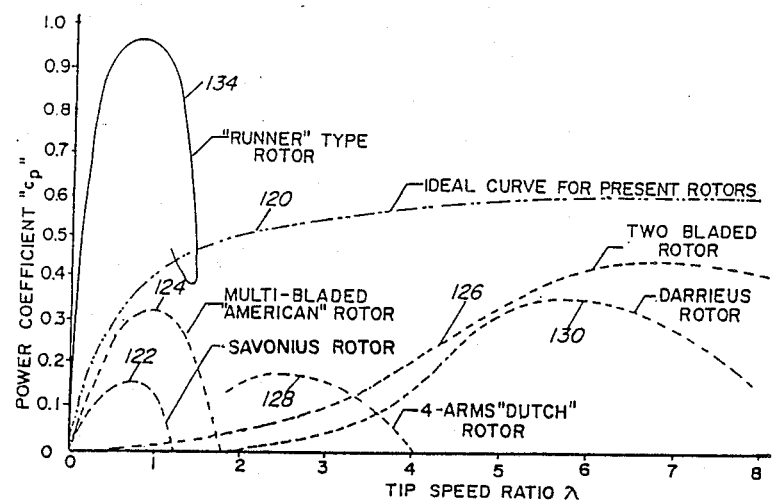
FIG. 9 is a chart diagram comparing the power coefficient of various turbine configurations relative to the tip speed ratios of various types of turbine configurations.
Figure 10:
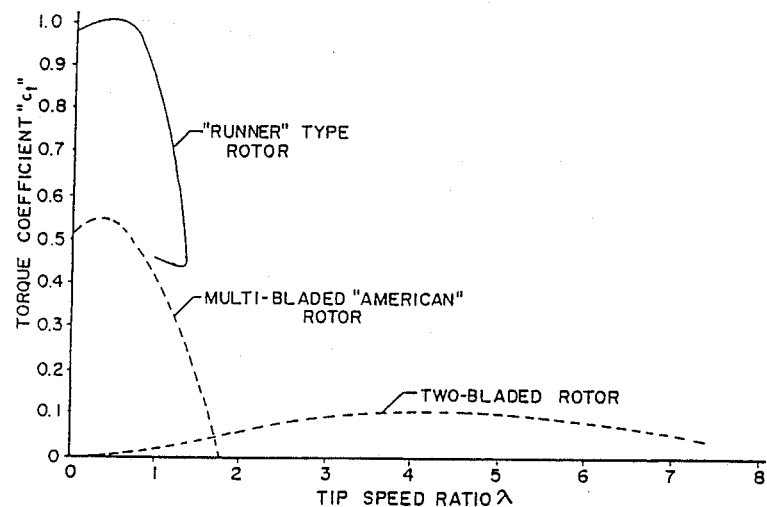
FIG. 10 is a diagram illustrating the torque coefficient relative to the tip speed ratio of various types of turbine configurations.

Referring now to FIGS. 9 and 10, a comparison between a wind turbine, referred to as a "runner" type rotor, of the present invention, and various conventional arrangements, are illustrated graphically. With reference to FIG. 9, the power coefficients' curves for the various arrangements are illustrated, relative to tip speed ratios, and in which an apparatus of the present invention constructed according to FIGS. 2 et.seq., was utilized.

As shown in FIG. 9, there is a theoretical ideal curve for known rotors indicated by the curve 120 and the known outputs for various arrangements are illustrated by the curves 122, 124, 126, 128 and 130. The power coefficient curve for the apparatus of the present invention, illustrated by curve 134, illustrates a desired "through-flow" capacity for air. At low wind stream speeds, meaning low values of λ, the power and torque factors increase with increasing tip-speed ratios. A further increase in the wind velocity does not produce the same increase in the rotational speed of the rotor and a "power coefficient" versus the tip-speed ratio curve for the runner type of turbine shows marked dip. This phenomena is related to the "choking" effect of the blade rotation and can be explained by the law of continuity expressed by the volumetric flow rate "$F_R$", the wind velocity "V" and through-flow are "R", which are related by the simple law: $F_R = V \times R$, stating that the mean velocity of flow of any fluid through any given area is a function of its volume. Therefore the blades through-flow area is able to absorb and release only a certain volume of air which increases with the wind velocity and the increased rotational speed, until the optimum value is reached.

Any increase in the wind velocity and therefore, any increase in the rotor's revolutions will produce a partial "through-flow" blocking effect by the blades and therefore an increasing resistance to the air-flow, resulting in a reduced volumetric flow-rate through blades and a partial blocking effect to the incoming wind-stream at the inlet of the turbine ring and the automatic reduction of relative wind inlet velocity. Accordingly, the turbine will automatically reach its optimum rotational speed and any increase in the wind speed will not affect much the rotation of the turbine's rotor. However the static pressure build-up of the slowed wind stream at the inlet opening to the runner will increase the power extracted by the rotor due to the pressure's differential increase across the blades.

Following the above, it can be seen that the power factor will not fall down to zero with the increased wind speed, as is the case with the known "American" or propeller type rotors. It follows also that the circumferential speed cannot reach critical values as is the case with the propeller type rotors. Obviously the drag forces on the rotor will increase with increased wind velocities and appropriate steps should be included to prevent structural damages.

With respect to the above discussion, it will also be understood that the power coefficient "$C_p$" (FIG. 9) is a function of the geometric arrangement of a wind turbine, determined by actual tests. In these tests, a second parameter employed was the "tip-speed ratio". Theoretically the higher the tip-speed ratio, the higher the extracted power coefficient will be for "perfectly" designed turbines. A wind turbine with a two or three bladed propeller has maximum efficiency at higher tip-speed ratios; a multi-bladed "American" wind turbine has its best performance at low tip-speed ratios. Both types of rotor arrangements have a critical rotational speed, which the wind is blocked by the rotor and no power is produced since the blades are following into a flow-distortion created by the preceding blades.

Figure 11:
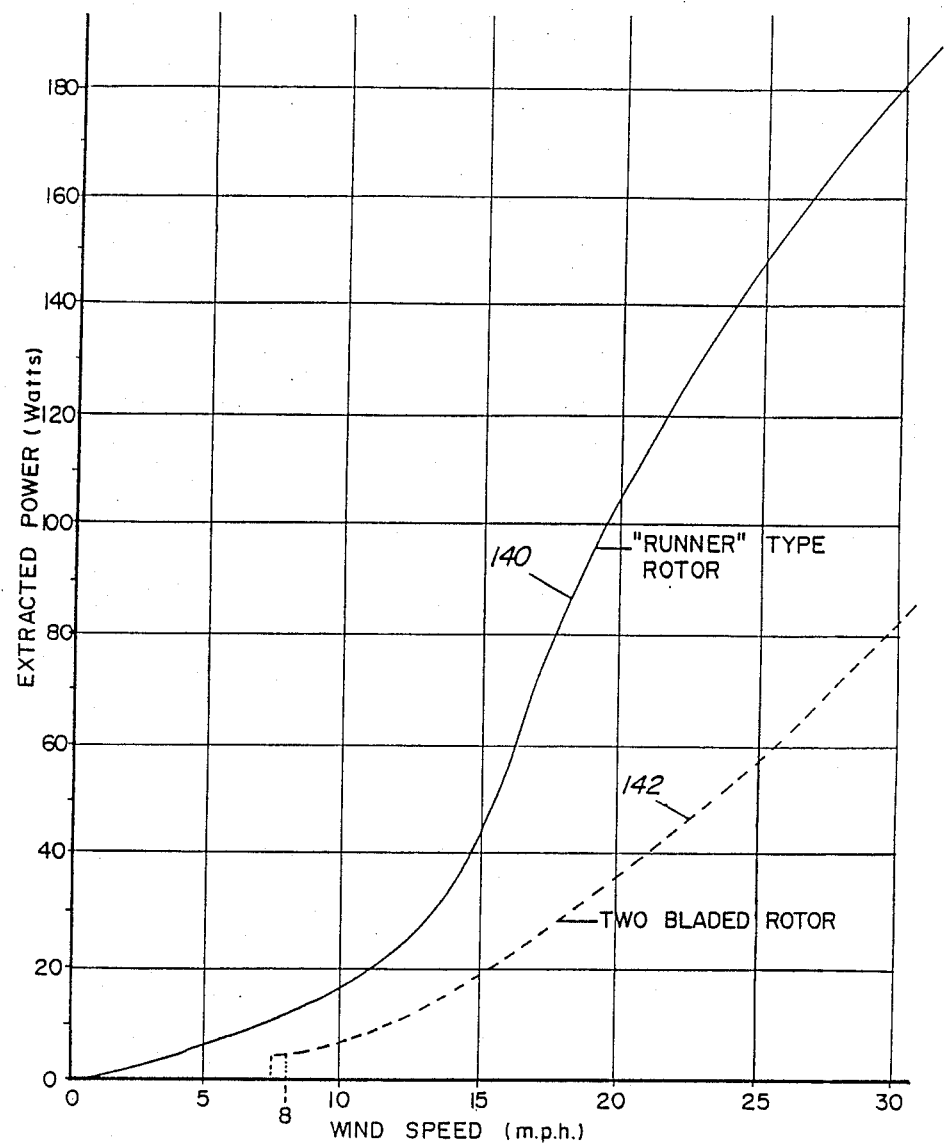
FIG. 11 is a chart diagram showing the power curves at low wind velocities of known blade-type turbines.

The arrangement of the present invention utilized for the tests illustrated in FIGS. 9 through 11 had a 36 inch wind-inlet diameter. From the results shown, and although the tip-speed ratio in the apparatus of the present invention does not have the same specific meaning as the multi-bladed or propeller type conventional arrangement,, it will be seen that the power coefficient of the apparatus of the present invention is at low wind velocities (tip-speed ratios) with very high results. The unique flow focusing and distribution system resulting from the apparatus of the present invention increases the extracting power as the efficiency of the rotor above the ideal "Betz coefficient" or limit, for non-shrouded propeller type turbines. These efficiencies can be reached and exceeded by the turbines of the present invention. It will also be seen from the summarized data that this higher power coefficient is reached at quite low wind speeds, at a low number of revolutions (meaning low tip-speed ratios) or low circumferential runner speeds. Compared to the prior art known arrangements, the maximum power extraction is reached at approximately $\frac{1}{8}$ of the tip-speed ratio for bladed type turbines; the tip-speed ratio compares to those achieved by the multi-bladed rotor but again, the power factor of the present invention is conservatively higher.

Following the behavior of the power coefficient versus the tip-speed ratio curve for the runner-type turbine in FIG. 9, it can be observed that this curve dips quite rapidly with the increased tip-speed ratio meaning that the increased wind velocity is not represented by the increased revolution of the turbine. However, the power factor does not reach zero as is the case with the multi-bladed rotor, but after reaching its lowest point, it starts climbing again, meaning the increase of the energy extraction. The tip-speed ratio remains at this point almost constant, indicating that the turbine is controlling its revolution despite the increased wind-stream speed, keeping its circumferential speed increase almost equal to the wind stream increase.

As illustrated in FIG. 11, it will be seen that the power extraction from an apparatus according to the present invention, the curve of which is designated by reference numeral 140, and taken from tests comparing the apparatus of the present invention with a conventional propeller type wind rotor (the power curve being designated by reference numeral 142) shows a very significant improvement over the conventional structure. In this respect, conventional structures typically have a starting wind speed for two and three bladed wind rotors in the neighbourhood of 8 miles per hour; whereas the extracted power curve for the structure of the present invention commences at a much lower speed as will be evident from the graph. Thus, power is extracted under low velocity winds and the effectiveness of the runner type rotor is much higher than the conventional arrangements.

Figure 12:
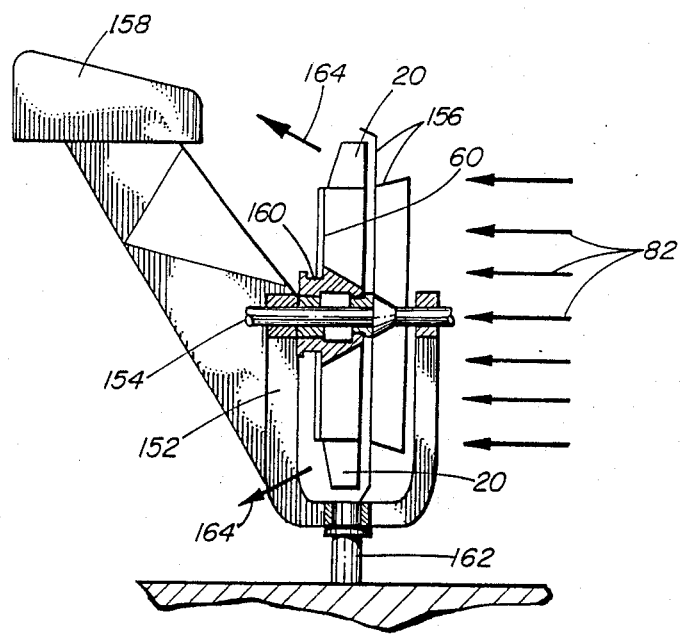
FIG. 12 is a schematic outline of a turbine with a horizontal axis configuration.

Referring now to FIGS. 12 et.seq., a modified apparatus to that shown in FIG. 2 is illustrated; in this arrangement, (where similar reference numerals have been used to designate similar components to those previously described), the apparatus may be mounted on a swivel stand 152; a stationary axis 154 is provided for the apparatus; the apparatus may also include a rotary or stationary wind inlet concentrator indicated generally by reference numeral 156 which may surround the peripheral portion of the blade 20 and which will project beyond the face of the blades 20 in a circumferential outline to direct the wind inwardly towards the disc 60. In a preferred embodiment, the apparatus may also have a vane 158 to align the unit with the wind direction. A power take-off wheel assembly 160 may also be employed and the whole unit may be mounted on a swivel shaft 162. A wind flow indicated by the arrows 82, after passing through the unit, is discharged generally in the direction indicated by the arrows 164.

Figure 13:
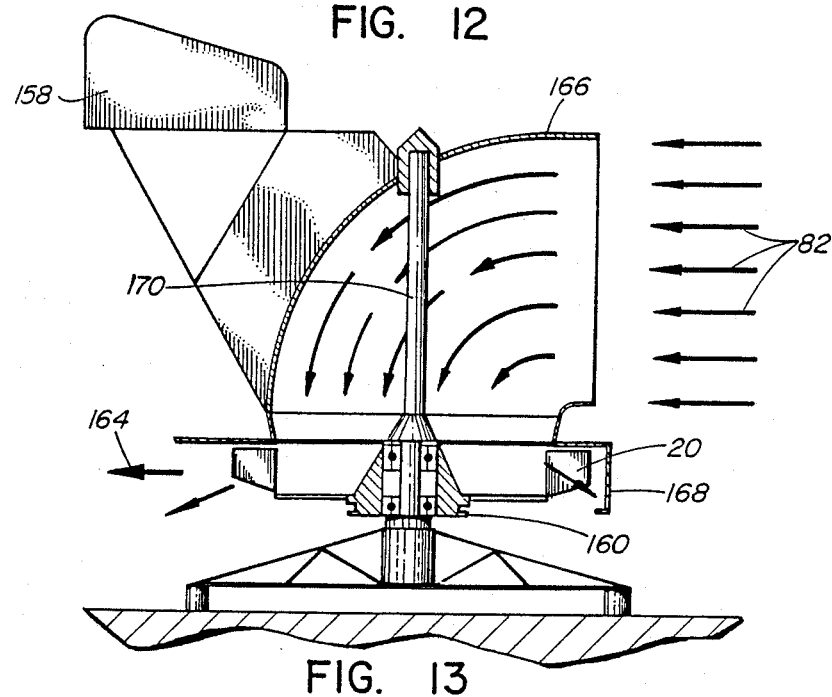
FIG. 13 is a schematic outline of a runner-type turbine with a vertical axis.

Contrary to the horizontal axial arrangement of FIG. 12, the arrangement shown in FIG. 13 utilizes a vertical axis and similar components. However, in this case, a 90° elbow-concentrator capable of swiveling, indicated by reference numeral 166 may be employed for mounting the apparatus. A shroud assembly 168 may be employed for mounting the unit. As will be seen, in this case, the power take-off assembly 160 is generally mounted in a horizontal manner. A vertical swivel shaft 170 may be employed for mounting the concentrator 166.

Figure 14:
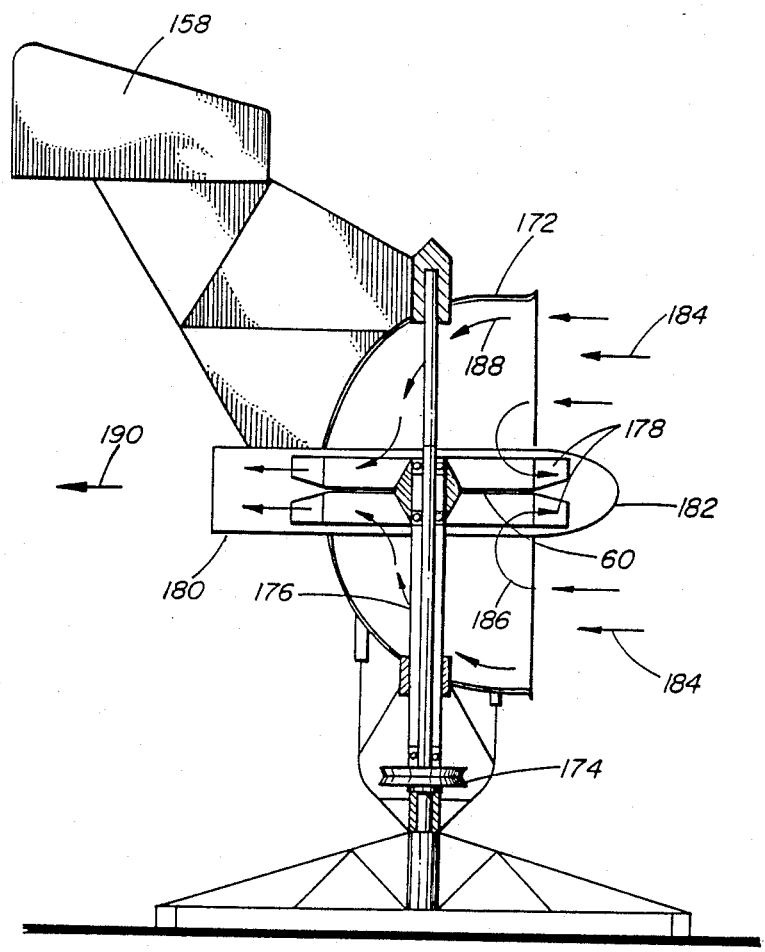
FIG. 14 is a schematic outline of a one rotor disc type turbine with a pair of sets of blades mounted in a back-to-back manner.

In the modified arrangement illustrated in FIG. 14, the device of the present invention utilizes a single rotor disc and a pair of sets of blades in a back-to-back arrangement utilizing a common power shaft. In this arrangement, again with similar reference numerals being used to designate previously described components, an inlet scoop and shroud may be utilized as indicated by reference numeral 172. A power take-off wheel or the like 174 may be centrally mounted on a power-shaft 176 journalled centrally of a disc 60. In this arrangement, a pair of spaced apart blade assemblies are employed indicated by reference 178 mounted about both major faces of the disc 60.

The arrangement may also include an outlet diffuser 180 and an air-outlet shroud 182. An air flow, indicated generally by the arrows 184, will enter the shroud assembly 172 and follow generally the lines indicated by reference numerals 186 and 188 where the assembly will thus utilize the flow imparted by the air which is discharged in the direction indicated by the arrow 190 through the outlet diffuser 180.

Figure 15:
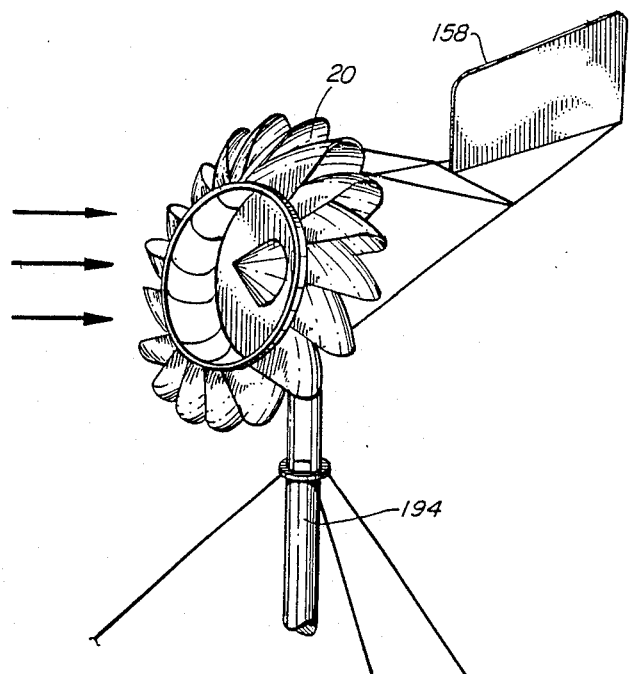
FIG. 15 is a perspective view of a runner-type turbine utilizing a horizontal shaft.
Figure 16:
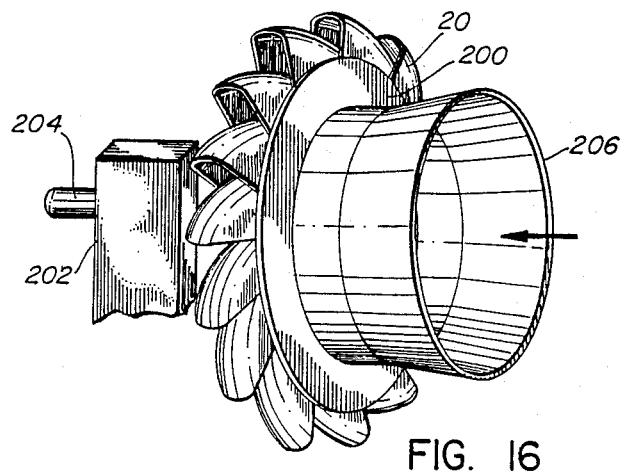
FIG. 16 is a perspective view of a runner-type turbine utilizing an inlet concentrator and a frontal shroud attached to the blade and rotating with the blades.
Figure 17:
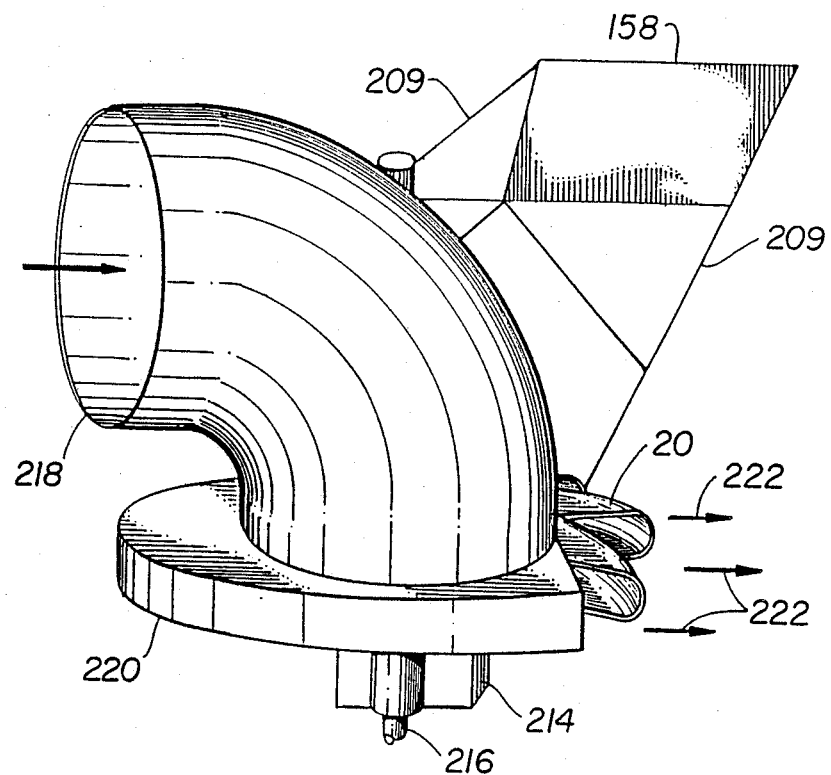
FIG. 17 is a perspective view of a runner-type turbine utilizing a vertical axis and with a movable air-inlet elbow.

The arrangements illustrated in FIGS. 15 through 17 show further variation of the invention. More particularly, a modified blade arrangement is illustrated in which the blade is provided with a conoid-shaped body, the shape and configuration of which will be described hereinafter in greater detail with reference to FIGS. 18 et seq. Again, similar components are designated by similar reference numerals. In the arrangement in FIG. 15, the apparatus is mounted on a central pivot 194 and utilizes a vane 158. Thus, the apparatus of the present invention, can be mounted as a free standing unit employing a horizontal shaft and a vertical disc and blade assembly without a concentrator, housing or an outlet diffuser.

In the arrangement employed in FIG. 16, a modified horizontal axis and air-inlet with vertical runners is employed and a front shroud 200 is employed. A stand 202 mounts a power take-off shaft 204. As will be seen, the front shroud also extends outwardly in the direction of the wind flow to provide an inlet portion for the apparatus as indicated by reference numeral 206.

In the arrangement illustrated in FIG. 17, again a control vane 158 is employed mounted by means of suitable supports 209 to the unit; in this case, the arrangement employs a vertical shaft with a horizontal air inlet and runner disc and is mounted on a stand 214 with a vertical power take-off shaft 216. An air inlet and concentrator elbow 218 is employed to direct an air flow indicated by the arrow into the unit; a shroud 220 protects the blades (shown partially in section) against the incoming air with the air outlets being indicated by arrows 222.

Figure 18:
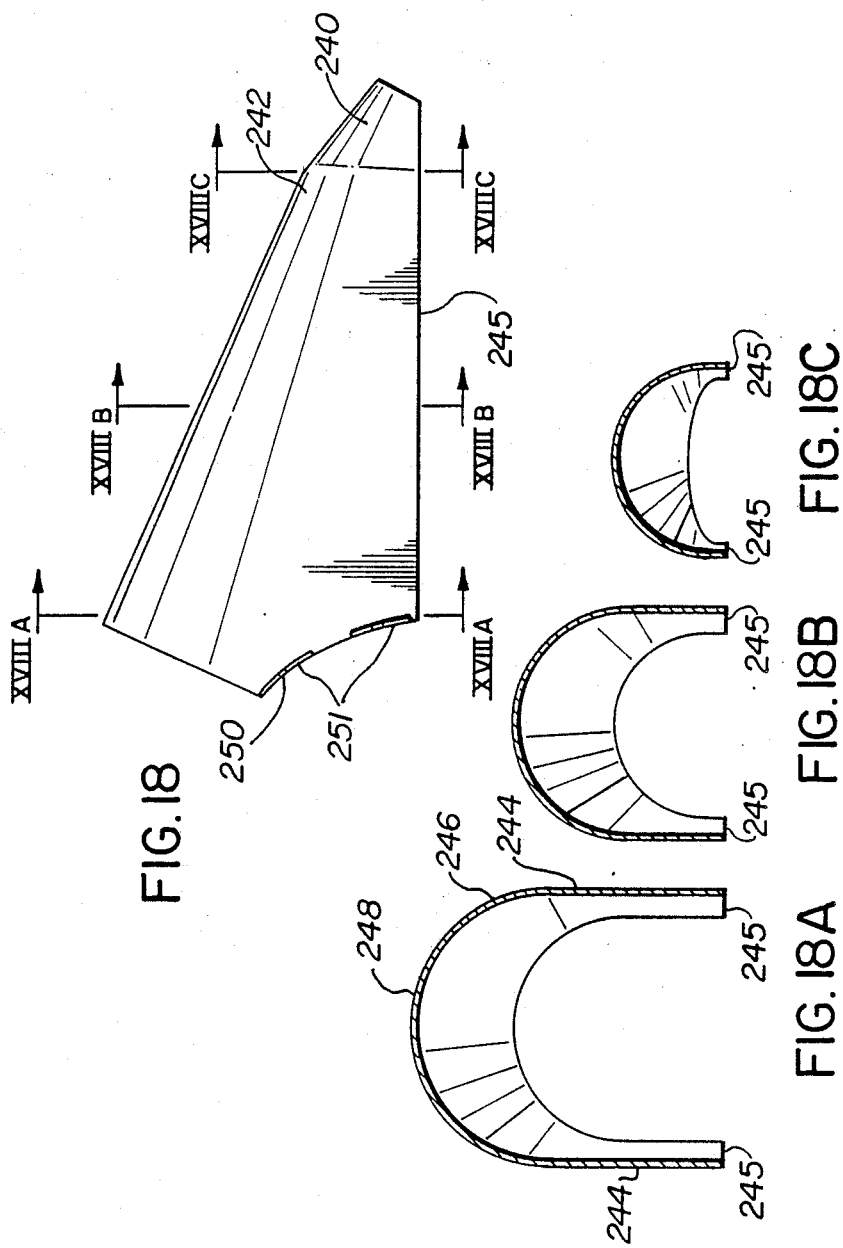
FIG. 18 is a side elevational view of a blade having a modification according to the present invention.

Referring now to FIG. 18, an alternate form of the blade is illustrated and as will be seen from FIGS. 18A to 18C, the blade is provided with the conoid shaped body similar to that described previously but in this case, the conoid shaped body includes a deflector 240 which extends downwardly and outwardly from the end section 242 of the body.

The conoid shaped body includes a pair of opposed side walls 244 which at their free end sides, are in substantially parallel relationship. Each of the sides 244 has an upper portion 246 arcuately blending into a top 248 which forms a continuous curved enclosure for the body each side having a side edge 245. As will be seen from the blade of the present invention, each of the blades has a varying cross-section so that the cross-section taken along the central portion of the conoid body is of greater cross-sectional area than the discharge portion (FIG. 18C) and in turn, the cross-sectional area at the end opposed to the discharge end (FIG. 18A) is greater than that in the central portion of the device.

The sides 244 include a further arcuately shaped margin 250 which in this case, include a pair of tabs 251 adapted to permit mounting of the blade to an assembly as described hereinafter. Referring again to the discharge end, the deflector 240 includes a downwardly projecting cowling which otherwise is intended to deflect the thrust of the wind captured by the blade from its normal orientation which would otherwise occur should the deflector not be present. To this end, the blade of FIGS. 18A through 18C differs from the blades previously described by including the deflector 240.

Figure 19:
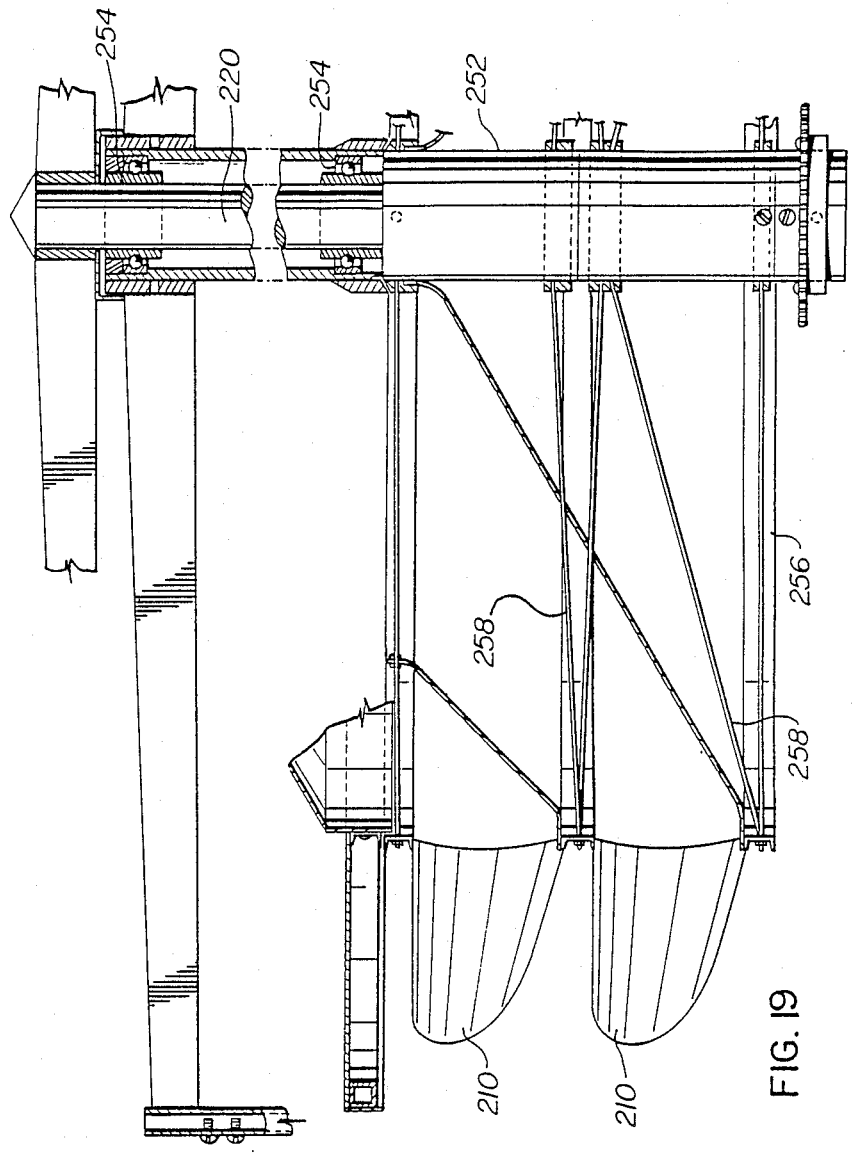
FIG. 19 is a partial elevational section showing the modified blade of FIG. 12 in a two tier arrangement.
Figure 20:
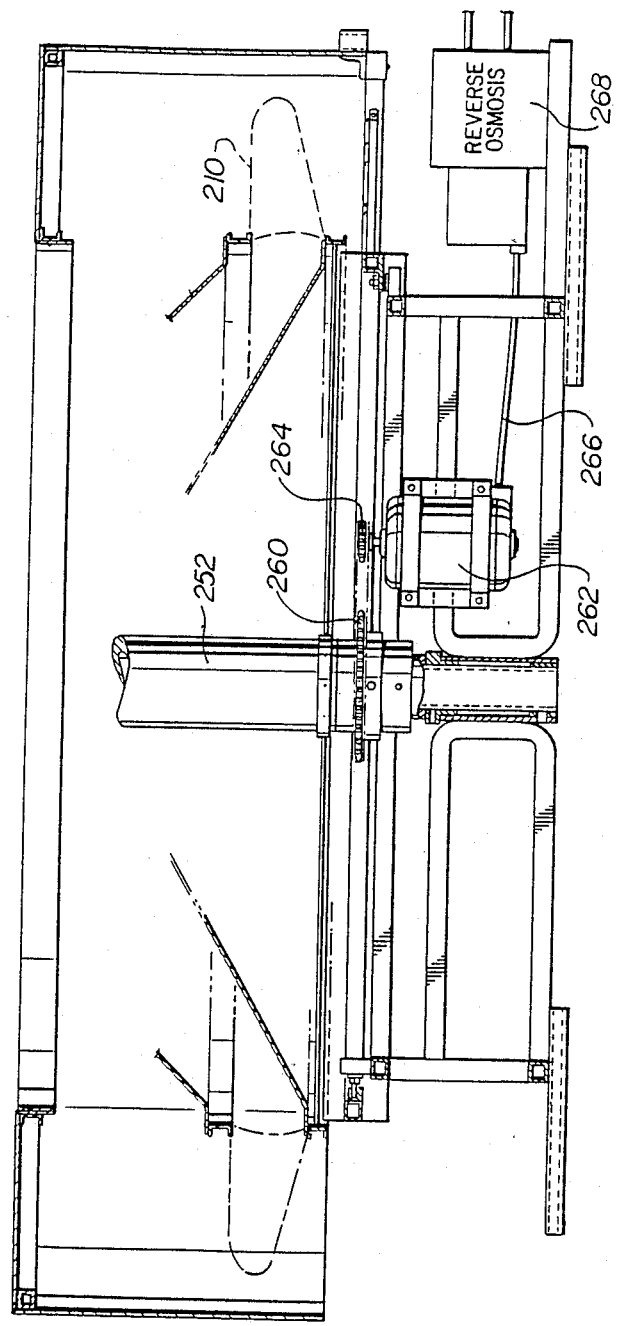
FIG. 20 is a partial sectional view showing a modified arrangement in the application of the device of the present invention in a distillation/purification system.

Referring now to FIG. 19, a double row of blades 210 is mounted to a hollow shaft 252 which in turn rotates about a fixed shaft 220 (described previously) by means of bearing assemblies 254. Bearing assemblies 254 may be located at spaced-apart points so as to provide more than one assembly for rotation of the shaft 252 about shaft 254. Blades 210, of the type previously described and which may include the deflector 240 are mounted about the periphery of a supporting member 256; as will be seen from FIG. 19, two rows of blades, one on top of the other, are provided. In order to facilitate mounting of the blades, the supporting structure otherwise fixedly secured to the shaft 252, may be braced with supporting rods 258 to provide added strength to the assembly. In this way, the structure shown in FIG. 19 can be utilized for various purposes, one of which is illustrated in FIG. 20 wherein similar parts are designated by similar reference numerals relative to the figures previously described. Thus, shaft 252 mounts a sprocket 260; a pump 262 is also provided with a sprocket 264 with a chain connecting the two sprockets 260 and 264 so that rotation of the shaft 252 will drive the pump member 262. Pump 262 is connected to a source of e.g. sea water and from there, the pump is effective to provide a supply of e.g. sea water through conduit 266 to a reverse osmosis device 268 where the sea water may be desalinated/purified to provide a source of potable water.

In the above arrangements, the pump 262 may be mounted to appropriate frame members by suitable means and the apparatus enclosed within a housing as desired.

Figure 21:
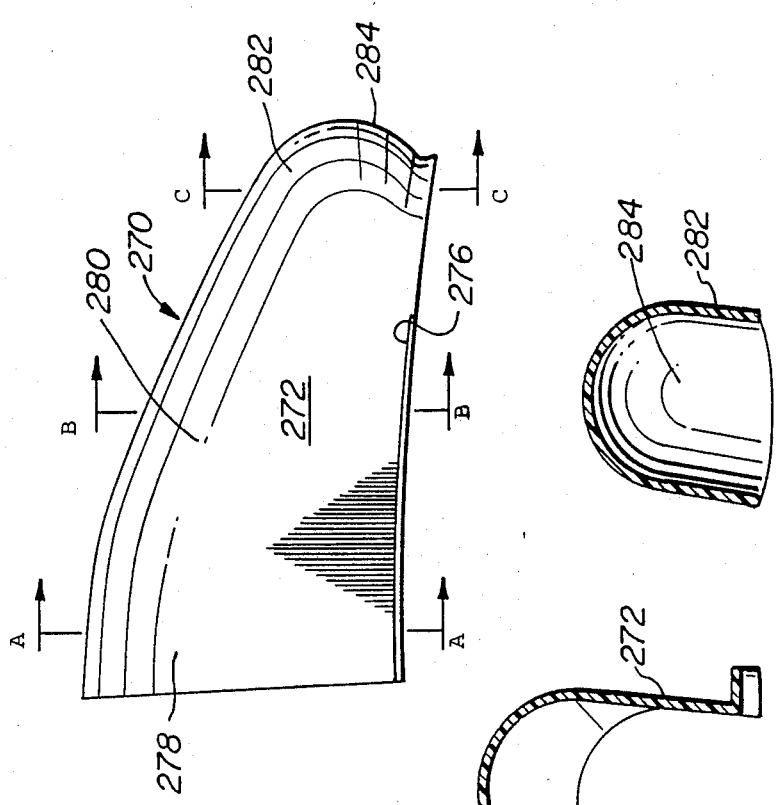
FIG. 21 is a perspective view of an alternate blade according to the present invention.

Referring now to FIG. 21, there is illustrated a modified blade design in which there is provided a closed end portion. In this blade, the conoid shaped configuration of the body indicated generally by reference numeral 270 includes a pair of generally parallel side panels 272 which terminate at their upper end in a concave shaped dome 274 with each side portion uniformally blending into the dome shaped member. The lower end portions include a pair of flanges 276 which are adapted to mount the blades 270 onto a supporting member in structure similar to e.g., that of FIG. 19. Such flanges 276 may extend only a portion of the length of the body.

As will be seen from FIG. 21, the dome shaped body includes a larger end 278 which has an area of greater cross-section along the line A—A than the intermediate portion 280 along the line B—B which in turn, still has a greater cross-section than the opposed end 282 along the line C—C.

Figure 24:
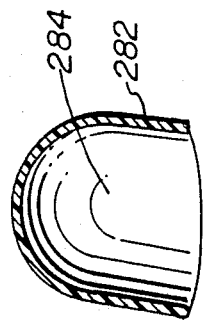
FIG. 24 is a section taken along the line C—C of FIG. 21.
Figure 23:
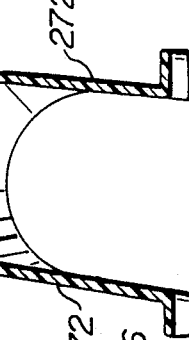
FIG. 23 is a section taken along the line B—B of FIG. 21.
Figure 22:
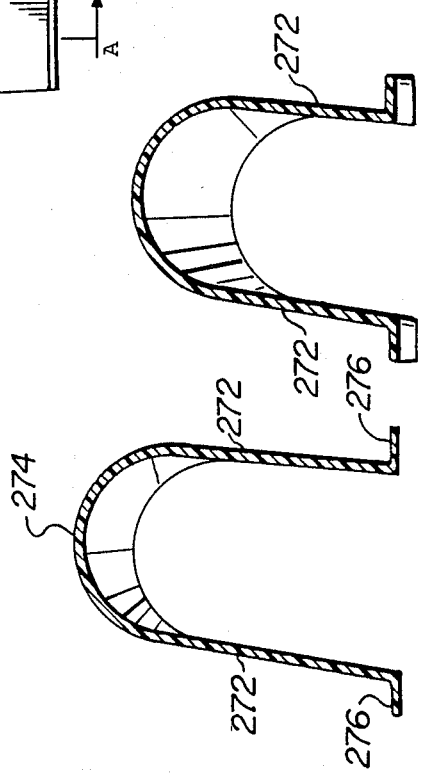
FIG. 22 is a section taken along the line A—A of FIG. 21.

In the modified version shown in FIG. 21, the blade not only includes a deflecting portion indicated generally by reference numeral 284 similar to that of FIG. 18 but further deflects the air stream approximately at right-angles to the axial flow within the body 270. Thus, the conoid shaped body includes, at one end, a deflector which extends at right-angles to change the direction of air flow within the body. In this arrangement, the sides 270 thus taper from one end to the other in a reducing cross-section. The upper dome member also blends into the deflector 284 in a concave configuration as seen from FIG. 24.

From the arrangements described above, it will be seen that the apparatus of the present invention is characterized by an increased power output and efficiency, and is adapted to utilize a maximum of the available energy carried by low speed "prevalent" winds while still being capable of operating at higher energy wind speeds.

The apparatus of the present invention substantially reduces the possibility of power failures or the "running away" effect of various conventional rotors during high wind velocities. The apparatus of the present invention is also versatile in that it can be mounted in a horizontal or vertical position and due to its sensitivity at low wind velocities and its high efficiency, can be installed at ground level or close to ground level thus reducing the cost of installation and maintenance.

Still further, relatively inexpensive rotor and blade materials can be employed and air flow inlet concentrators may be used to direct an air stream into the center of a rotor disc. Such an arrangement will still further improve the efficiency of power conversion as it will shield the rotor blades from cutting into an incoming wind stream. The frontal shield and in that concentrator can be part of the apparatus attached to and rotating with it or, can be mounted as a separate unit by suitable supports.

Preferably, if an elbow is employed as a "air scoop", it is mounted on a centrally located shaft serving as a pivot and desirably, a wind vane is attached to the scoop to provide means for keeping the air inlet perpendicular to the oncoming wind. As indicated, a shroud may be employed to extend over the frontal and outside area of a rotor, again protecting its blades from turning back into a flowing wind-stream and also acting as a rotor protector against any wind borne objects. It may also be used as a means of protecting an operator. If desired, the air scoop may be mounted at elevations above the unit to collect winds with higher velocities where a turbine is installed at ground level. Preferably the concentrator elbow is rotatably mounted on a common shaft with the apparatus or alternately, other conventional rotary guide arrangements may be employed to facilitate its pivotal movement to respond to different wind directions. Still further, the concentrator elbow may be constructed so as to collapse at high wind speeds for protection against damage to the disc and blades caused by drag pressure forces, or against heavy rain or snowfall. As illustrated in the drawings, the apparatus of the present invention may also be constructed with two or more sets of blades, mounted back-to-back, for an increase in power production. In this arrangement, a larger air scoop area will have to be provided, e.g., double the typical single blade arrangement, to increase the quantity kinetic energy entering the turbine. The rotor or disc does not, however, have to be increased in diameter to recover efficiently the amount of energy contained in the increased air volume. Thus, unlike present day rotors, the apparatus of the present invention can increase its power output using standardized-elements for the runner disc and its blades and thus offer more inexpensive units, simpler construction and more economical wind-extracting systems In practicing the invention, the various components of the turbine assembly, and the blade per se, can be manufactured of suitable material suitable for the purpose intended. Thus, for example, the blades and associated components can be made of material such as rigid or semi-rigid plastic materials, sheet metals such as sheet aluminum, etc.

It will be understood that various modifications can be made to the above described embodiments without departing from the spirit and scope of the invention.

I claim:

1. A turbine blade, for use in a wind turbine, for receiving a flow of air from a windstream at an inlet of said blade and deflecting the air to an outlet of said blade, the blade comprising a pair of opposed planar sides joined by a arcuate portion to form a hollow conoidal shaped body having a longitudinal axis and tapering from said inlet to said outlet, and a cross-section decreasing longitudinally along said axis, from said inlet to said outlet, means for connecting the blade with said axis of the hollow conoidal shaped body at an angle to said flow of air to the blade.

2. The device of claim 1, wherein said blade includes deflecting means for deflecting a fluid flow from said outlet in a direction angularly disposed relative to the normal fluid flow established by said conoid-shaped body.

3. The device of claim 1, wherein said conoid-shaped body has a pair of spaced-apart lateral sides, each one of said pair having angularly disposed terminal side edges extending upwardly and outwardly towards said discharge outlet.

4. The device of claim 1, wherein said conoid-shaped body has a pair of opposed spaced apart lateral sides, one of said sides projecting beyond the other of said sides.

5. The device of claim 2, wherein said deflecting means extends downwardly to deflect said fluid flow from said outlet at an angle of up to about 35° relative to said axial flow.

6. A turbine blade assembly comprising a plurality of the turbine blades of claim 2, said blades being arranged in a generally aligned circular configuration, the outlets of the blades being arranged in a common plane.

7. The assembly of claim 6, said assembly including fluid impermeable deflecting means operatively mounted on one side of said assembly to provide fluid barrier means whereby a flow of fluid is adapted to be deflected by said deflecting means towards said circular configuration of turbine blades.

8. The assembly of claim 6, comprising at least two of such assemblies mounted directly or indirectly on a common axis, said assemblies being operatively connected to power take-off means.

9. The blade of claim 1 wherein said outlet includes a cowling projecting downwardly and inwardly relative to said arcuate portion, whereby an air-flow is adapted to be directed from a first direction to a second direction displaced from said first direction.

10. An apparatus for water purification comprising power generating means having the assembly of claim 6, said power generating means providing electrical power for driving pump means, pump means for providing a source of water under pressure, and water purifying means for receiving water fed by said pump means.

11. A method of recovering usable energy from a moving fluid stream having a principal fluid flow in a primary first direction comprising disposing a conoid-shaped body in said fluid flow, said conoid-shaped body having a hollow interior in which said hollow interior faces said fluid flow direction, intercepting a first component of fluid flow of said fluid stream in an inlet portion of said conoid body to deflect said first component and tangentially to the principal fluid flow direction of said fluid stream, angularly intercepting a second component of said fluid flow within said conoid-shaped body and deflecting said intercepted second component in tangentially of the fluid flow direction, combining the axial fluid flows of said first and second components, causing the combined axial flow to pass through an area of reduced cross-section, and deflecting the combined axial flow in a direction angularly disposed relative to the principal direction of the combined axial flow.

12. A method as defined in claim 11, wherein a third vectorial component of said fluid stream is intercepted by said conoid body and tangentially deflected by said body to form a third fluid flow, said third fluid flow being combined with said first and second fluid flows in a common axial direction.

13. A method as defined in claim 11, wherein the combined flow is discharged in a deflected form with the degree of deflection of the axial flow being in an amount up to about 35° relative to the principal direction of the combined axial fluid flow.

14. A method as defined in claim 13, wherein the combined flow is discharged in a deflected form with the degree of deflection of the axial flow being in an amount from about 1° to about 30° relative to the principal direction of the combined axial fluid flow.

15. A method as defined in claim 11, wherein a plurality of conoid-shaped bodies are disposed about a common axis in the direction of the principal flow of said fluid stream.

16. A method as defined in claim 11, wherein said conoid-shaped body is mounted for rotational movement in the principal flow direction of said fluid stream.

17. A blank for forming a turbine blade comprising a sheet of bendable non-flexible material, said sheet having a generally planar configuration with a pair of opposed major surfaces, said sheet forming a body having a first side forming an arcuately contoured inlet edge for said body, a pair of opposed lateral sides angularly disposed relative to said contoured first side and extending backwardly and outwardly therefrom, a second pair of sides angularly disposed relative to said first pair of sides and extending inwardly and rearwardly of said body, and a rearwardly projecting recess between said sides of said second pair of sides, said blank being bendable along an axial line extending between said first arcuate side and said last mentioned side to form a body of a generally conoid configuration.

18. The blank of claim 17, wherein said blank is formed of sheet metal.

* * * * *